US012367742B2

(12) United States Patent
Marsh et al.

(10) Patent No.: US 12,367,742 B2
(45) **Date of Patent: *Jul. 22, 2025**

(54) SYSTEMS AND METHODS FOR A FREE SPIN COUNT-UP AND SUBSEQUENT COUNT-DOWN

(71) Applicant: Aristocrat Technologies, Inc., Las Vegas, NV (US)

(72) Inventors: David Marsh, Charlottesville, VA (US); Daniel Marston, Reno, NV (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 341 days.

This patent is subject to a terminal disclaimer.

(21) Appl. No.: 17/931,030

(22) Filed: Sep. 9, 2022

(65) Prior Publication Data

US 2023/0080994 A1 Mar. 16, 2023

Related U.S. Application Data

(63) Continuation-in-part of application No. 17/710,295, filed on Mar. 31, 2022, now Pat. No. 12,027,016.

(60) Provisional application No. 63/244,369, filed on Sep. 15, 2021.

(51) Int. Cl.

*G07F 17/32* (2006.01)
*A63F 3/06* (2006.01)

(52) U.S. Cl.

CPC ........ *G07F 17/3258* (2013.01); *A63F 3/0645* (2013.01); *G07F 17/3213* (2013.01); *G07F 17/3267* (2013.01)

(58) Field of Classification Search

CPC ............. G07F 17/3213; G07F 17/3267; G07F 17/3258; G07F 17/34; G07F 17/3244

See application file for complete search history.

(56) References Cited

U.S. PATENT DOCUMENTS

| | | | |
|---|---|---|---|
| 6,186,894 | B1 | 2/2001 | Mayeroff |
| 8,430,740 | B2 | 4/2013 | Yamauchi |
| 9,153,101 | B2 | 10/2015 | Cannon |

(Continued)

OTHER PUBLICATIONS

Office Action (Non-Final Rejection) dated Sep. 8, 2023 for U.S. Appl. No. 17/710,295 (pp. 1-7).

(Continued)

*Primary Examiner* — Justin L Myhr
(74) *Attorney, Agent, or Firm* — Armstrong Teasdale LLP

(57) ABSTRACT

A free spin count-up bonus game and a subsequent banked free spin count-down secondary bonus game are described herein. The free spin count-up game may be triggered during play of a base game. A numerical indicium may be provided. During the free spin count-up bonus game, the indicium may count up from an initial value to a final value. When the indicium reaches a maximum or final value, the value may be regarded as indicating a number of "banked" free spins. The number of banked free spins may be compared to one or more threshold values. If the number of banked dree spins is greater than or equal to one or more threshold values and there is a successful outcome on a random determination, a secondary bonus game may be initiated, during which the indicium is decremented from the final value back down toward the initial value.

20 Claims, 24 Drawing Sheets

(56) References Cited

U.S. PATENT DOCUMENTS

| | | | |
|---|---|---|---|
| 2008/0318656 | A1 | 12/2008 | Walker |
| 2009/0233691 | A1 | 9/2009 | Yoshizawa |
| 2012/0172107 | A1* | 7/2012 | Acres ...................... G07F 17/34 463/16 |
| 2013/0303257 | A1 | 11/2013 | Kitamura |
| 2013/0310144 | A1 | 11/2013 | Masumi |
| 2015/0080107 | A1 | 3/2015 | Hirato |
| 2015/0348374 | A1 | 12/2015 | Dupuis |
| 2019/0304255 | A1 | 10/2019 | San |
| 2019/0318579 | A1 | 10/2019 | Marsh |
| 2019/0355218 | A1 | 11/2019 | Visser |
| 2021/0104127 | A1 | 4/2021 | Schaefer |

OTHER PUBLICATIONS

Office Action (Notice of Allowance and Fees Due (PTOL-85)) dated Feb. 16, 2024 for U.S. Appl. No. 17/710,295 (pp. 1-8).
Australian Examination Report No. 1 issued in App. No. AU2022231738, dated Apr. 11, 2024, 5 pages.
Australian Examination Report No. 1 issued in App. No. AU2023201981, dated Jun. 26, 2024, 3 pages.

* cited by examiner

SYSTEMS AND METHODS FOR A FREE SPIN COUNT-UP AND SUBSEQUENT COUNT-DOWN

CROSS-REFERENCE TO RELATED APPLICATIONS

This application is a continuation-in-part of and claims the benefit of priority to U.S. patent application Ser. No. 17/710,295, filed Mar. 31, 2022, which in turn claims the benefit of priority to U.S. Provisional Patent Application No. 63/244,369, filed Sep. 15, 2021, the entire contents and disclosure of which are hereby incorporated by reference in their entirety.

TECHNICAL FIELD

The field of disclosure relates generally to electronic gaming, and more particularly to systems and methods for displaying a plurality of free spins during a free spin count-up as well as displaying a secondary bonus game during a subsequent free spin count-down, wherein a number of free spins received during the count-up is stored and used as the number of free spins awarded in the subsequent count-down.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

BRIEF DESCRIPTION

In one aspect, an electronic gaming device is described. The electronic gaming device includes a display device and a processor configured to execute instructions stored in a memory device. When executed, the instructions cause the processor to at least initiate a primary bonus game in response to a free play trigger condition being satisfied during a base game and determine a number of free spins of a plurality of reels for use during the primary bonus game. The instructions further cause the processor to control the display device to simulate spinning and stopping the plurality of reels in conjunction with sequentially counting up from an initial numerical indicium to a final numerical indicium in association with spinning the plurality of reels according to the determined number of free spins and on a condition that there is a successful outcome on a random determination, initiate a secondary bonus game that includes a free spin count-down from the final numerical indicium to the initial numerical indicium.

In another aspect, a gaming system is described. The gaming system includes at least one memory and a processor configured to execute instructions stored in the memory. When executed, the instructions cause the processor to at least initiate a primary bonus game in response to a free play trigger condition being satisfied during a base game and determine a number of free spins of a plurality of reels for use during the primary bonus game. The instructions further cause the processor to simulate spinning and stopping the plurality of reels in conjunction with sequentially counting up from an initial numerical indicium to a final numerical indicium in association with spinning the plurality of reels according to the determined number of free spins and on a condition that there is a successful outcome on a random determination, initiate a secondary bonus game that includes a free spin count-down from the final numerical indicium to the initial numerical indicium.

In yet another aspect, a non-transitory computer-readable storage medium is provided. The non-transitory computer-readable storage medium includes instructions stored thereon that, in response to execution by at least one processor, cause the at least one processor to initiate a primary bonus game based on a free play trigger condition being satisfied during a base game, determine a number of free spins of a plurality of reels for use during the primary bonus game, and simulate spinning and stopping the plurality of reels. The instructions further cause the processor to count up, sequentially, from an initial numerical indicium to a final numerical indicium during each spin of the plurality of reels according to the determined number of free spins and on a condition that there is a successful outcome on a random determination, initiate a secondary bonus game that includes a free spin count-down from the final numerical indicium to the initial numerical indicium.

DETAILED DESCRIPTION

Figure 1:
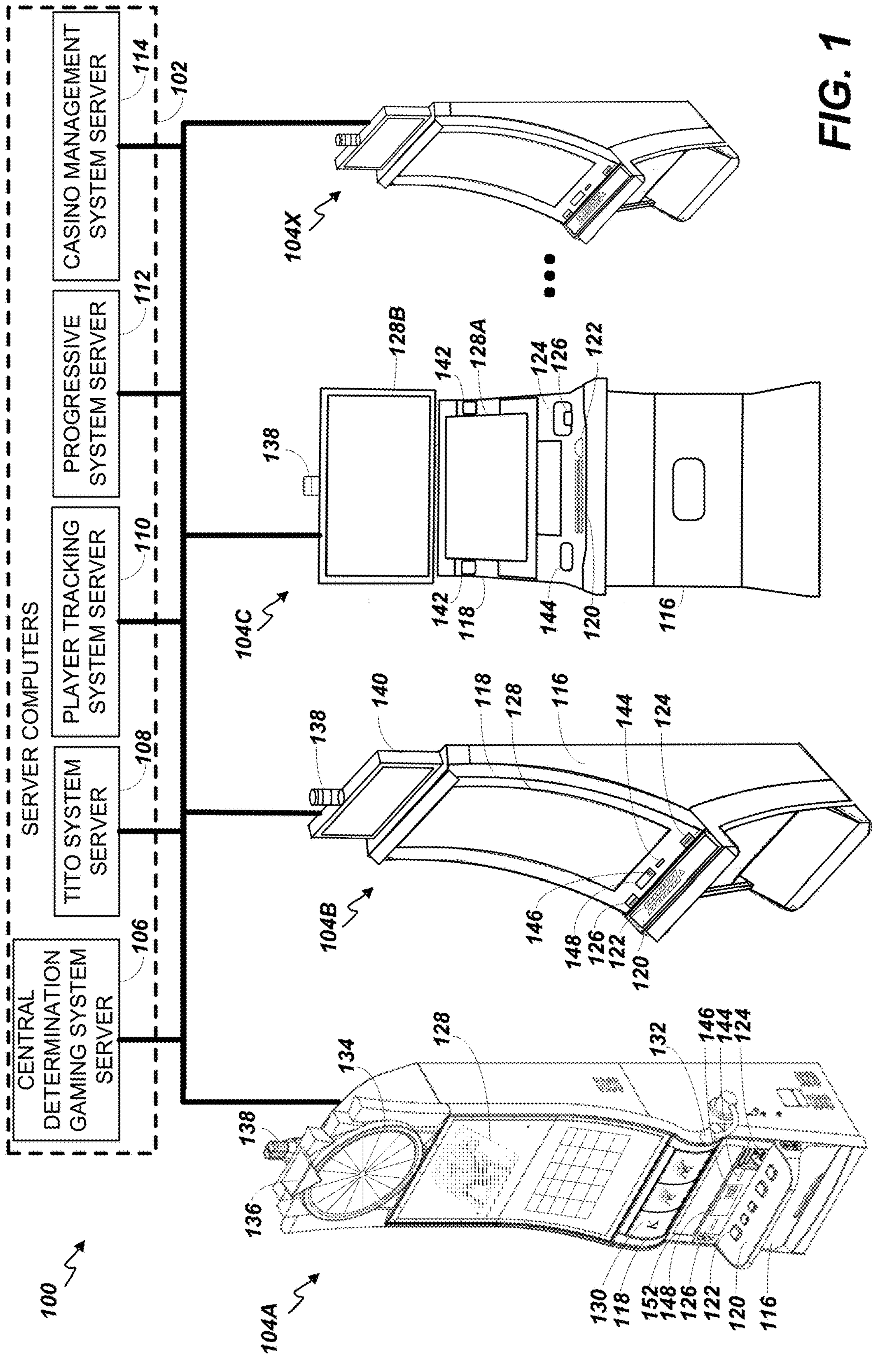
FIG. 1 is an example diagram showing several EGMs networked with various gaming related servers.

A free spin count-up bonus game as well as a subsequent banked free spin count-down secondary bonus game are described herein. More particularly, the free spin count-up game may be triggered during play of a base game, such as a base bingo game, during which a total bingo award may be divided into a plurality of smaller awards provided during one or more free spins. In addition, a numerical indicium, such as a count-up and count-down indicium, may be provided. The indicum may be located within an orb or other animation. The indicium may, in some embodiments, count up from an initial value to a final value based on the number of free spins determined from the total bingo award. Likewise, when the indicium reaches a maximum or final value, the value may be regarded as indicating a number of "banked" free spins. The display may indicate which free spins are "banked" by turning the screen red during those spins.

The number of banked free spins and a random output may be used to determine whether a secondary or "red spins run" bonus game may be initiated. For example, the number of banked free spins may be compared to one or more threshold values. Further, a random output may be determined using a ball call or an RNG output and a lookup table. If the number of banked free spins is greater than or equal to one or more threshold values and there is a successful outcome on the random determination (e.g., using a ball call or an RNG output and a lookup table), the secondary bonus game may be initiated, during which, for example, the indicium may be decremented from the final value back down toward the initial value. Each time the indicium is decremented, the secondary bonus game may be played, such as for example, by spinning a plurality of reels, launching a group of fireworks, moving a reticle on a bonus game board, and the like. If a secondary free-spins count-down game is initiated, the reels may change to a set of reels comprising credit symbols (e.g., cash on reels symbols) and each time the indicium is decremented, the reels may spin. The credit symbols may be sticky symbols that, when displayed selected on a spin, hold in place for the remainder of the secondary free-spins count-down game. The credit symbol may comprise a credit value or identify a jackpot (e.g., as mini, minor, etc.).

Moreover, in some embodiments, a total award may be allocated prior to initiation of the free play bonus game and/or the secondary bonus game. For example, in some embodiments, a first portion of the total award may be allocated for distribution or payment to the player during the free play bonus game, such as using the plurality of free spins contributing to the free spin count-up. Likewise, a second portion of the total award may be allocated to the secondary bonus game for distribution, at least in part, to the player during the count-down initiated from the secondary bonus game. As a result of the partitioning of the total award into a first and second portion, a game controller may determine a portion of the payout for both bonus games ahead of time, prior to initiation of either game, thereby reducing the processing power and time required to execute the bonus games. In some embodiments, whether the game enters into a secondary bonus game may be determined at least in part by a random output, thereby providing a further improvement to variability of game outcomes.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementation, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light emitting diode (LED), or organic light emitting diode (OLED) panel which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless ticket ("TITO") system). In such cashless implementations, the gaming device 104A may also include a "ticket-out" printer 126 for outputting a credit ticket when a "cash out" button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Gaming devices 104A have traditionally also included a handle 132 typically mounted to the side of main cabinet 116 which may be used to initiate game play.

Figure 2A:
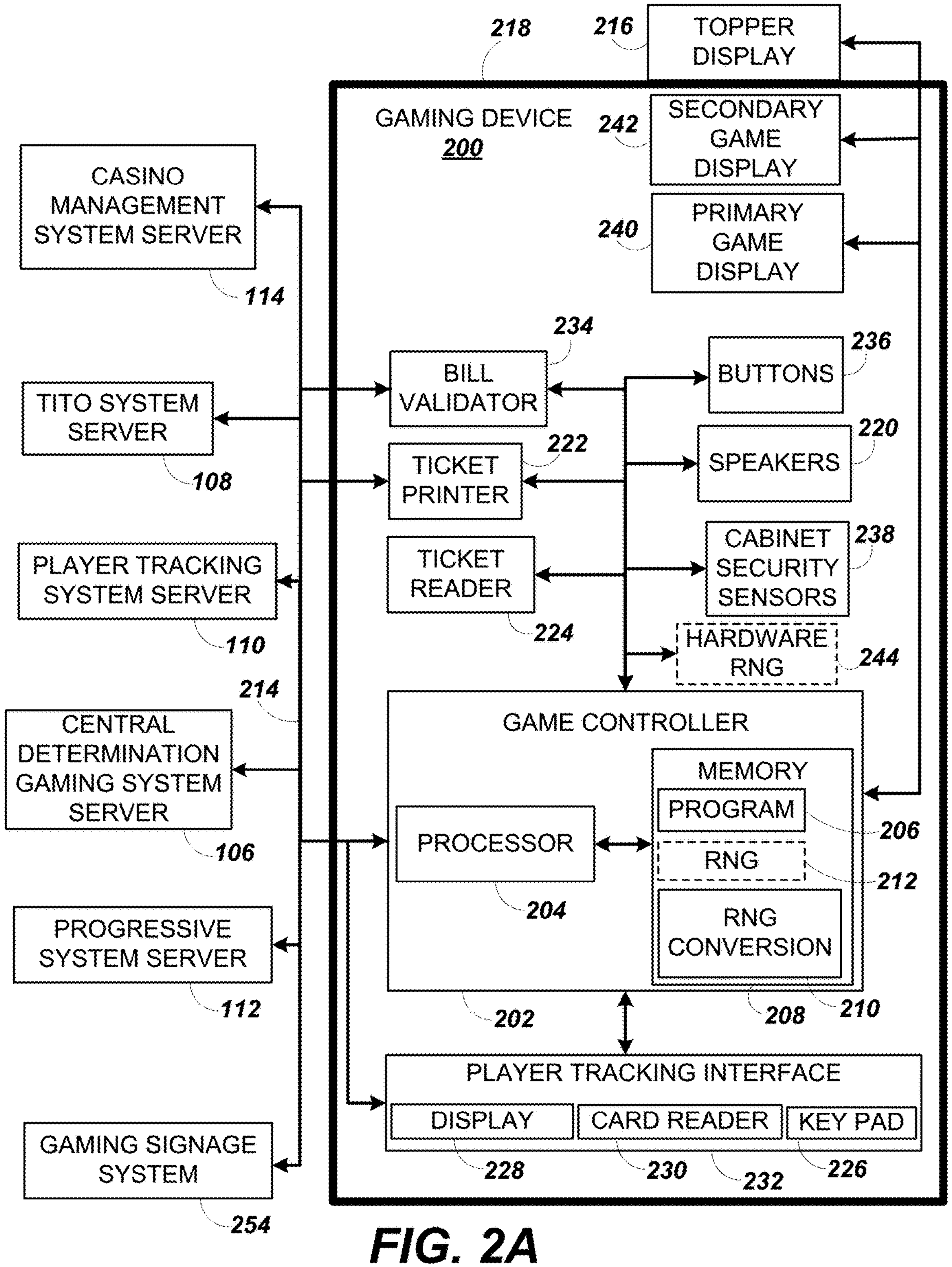
FIG. 2A is a block diagram showing various functional elements of an example EGM.

Many or all the above described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2A is a block diagram depicting example internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 2B:
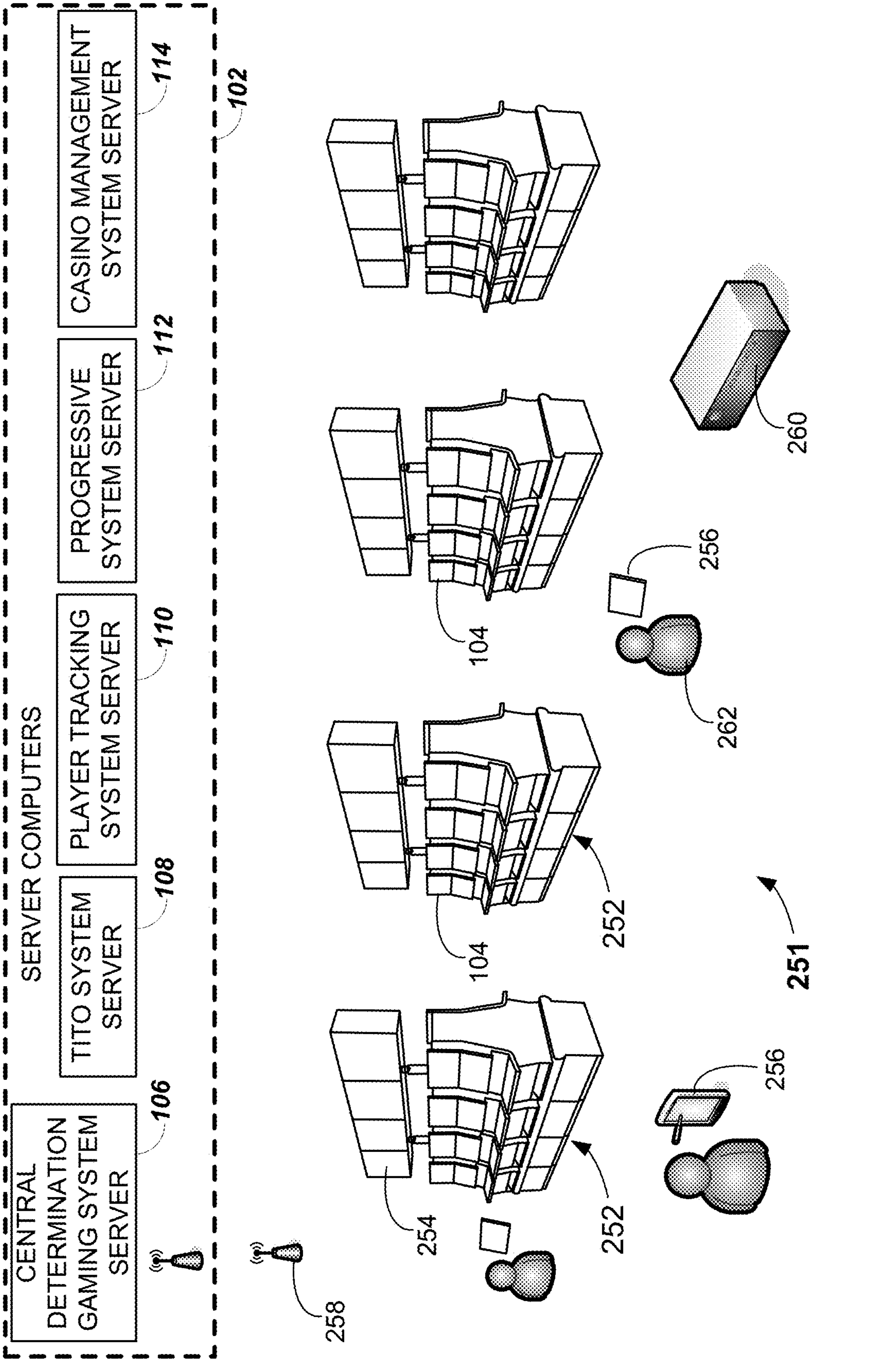
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor(s) to verify the identity of an authorized patron. Some mobile gaming devices 256 may be configured to function only within a predetermined or configurable area, such as a casino gaming area.

Figure 2C:
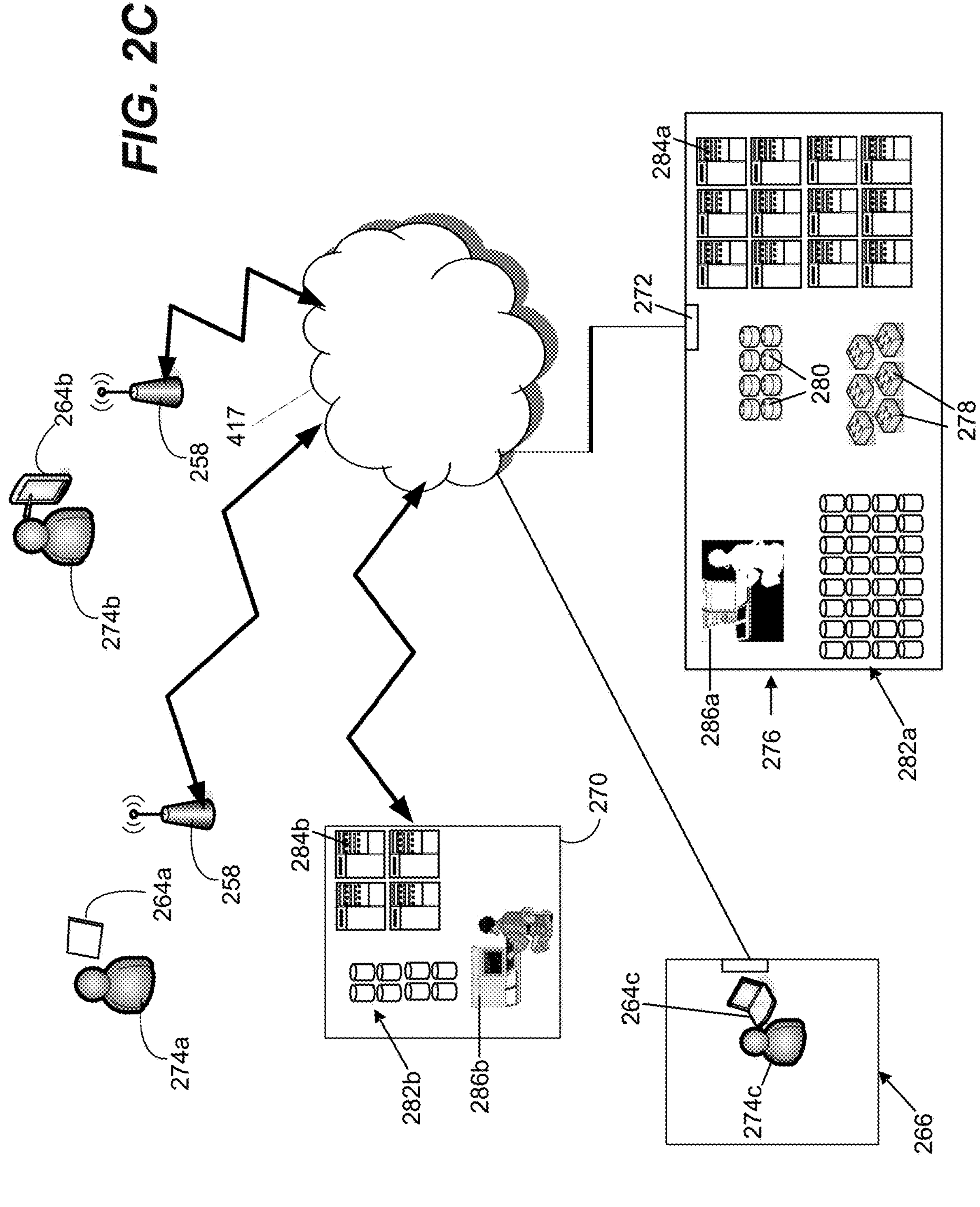
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264*a*, 264*b* and 264*c* are capable of communication via one or more networks 417. The networks 417 may, for example, include one or more cellular telephone networks, the Internet, etc. In this example, the EUDs 264*a* and 264*b* are mobile devices: according to this example the EUD 264*a* is a tablet device and the EUD 264*b* is a smart phone. In this implementation, the EUD 264*c* is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272. In this example, switches 278 and routers 280 are configured to provide network connectivity for devices of the gaming data center 276, including storage devices 282*a*, servers 284*a* and one or more workstations 570*a*. The servers 284*a* may, for example, be configured to provide access to a library of games for online game play. In some examples, code for executing at least some of the games may initially be stored on one or more of the storage devices 282*a*. The code may be subsequently loaded onto a server 284*a* after selection by a player via an EUD and communication of that selection from the EUD via the networks 417. The server 284*a* onto which code for the selected game has been loaded may provide the game according to selections made by a player and indicated via the player's EUD. In other examples, code for executing at least some of the games may initially be stored on one or more of the servers 284*a*. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284*b*, storage devices 282*b*, and one or more workstations 286*b*. According to this example, the financial institution data center 270 is configured to maintain financial accounts, such as checking accounts, savings accounts, loan accounts, etc. In some implementations one or more of the authorized users 274*a*-274*c* may maintain at least one financial account with the financial institution that is serviced via the financial institution data center 270.

According to some implementations, the gaming data center 276 may be configured to provide online wagering games in which money may be won or lost. According to some such implementations, one or more of the servers 284*a* may be configured to monitor player credit balances, which may be expressed in game credits, in currency units, or in any other appropriate manner. In some implementations, the server(s) 284*a* may be configured to obtain financial credits from and/or provide financial credits to one or more financial institutions, according to a player's "cash in" selections, wagering game results and a player's "cash out" instructions. According to some such implementations, the server(s) 284*a* may be configured to electronically credit or debit the account of a player that is maintained by a financial institution, e.g., an account that is maintained via the financial institution data center 270. The server(s) 284*a* may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274*a*-274*c*), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3:
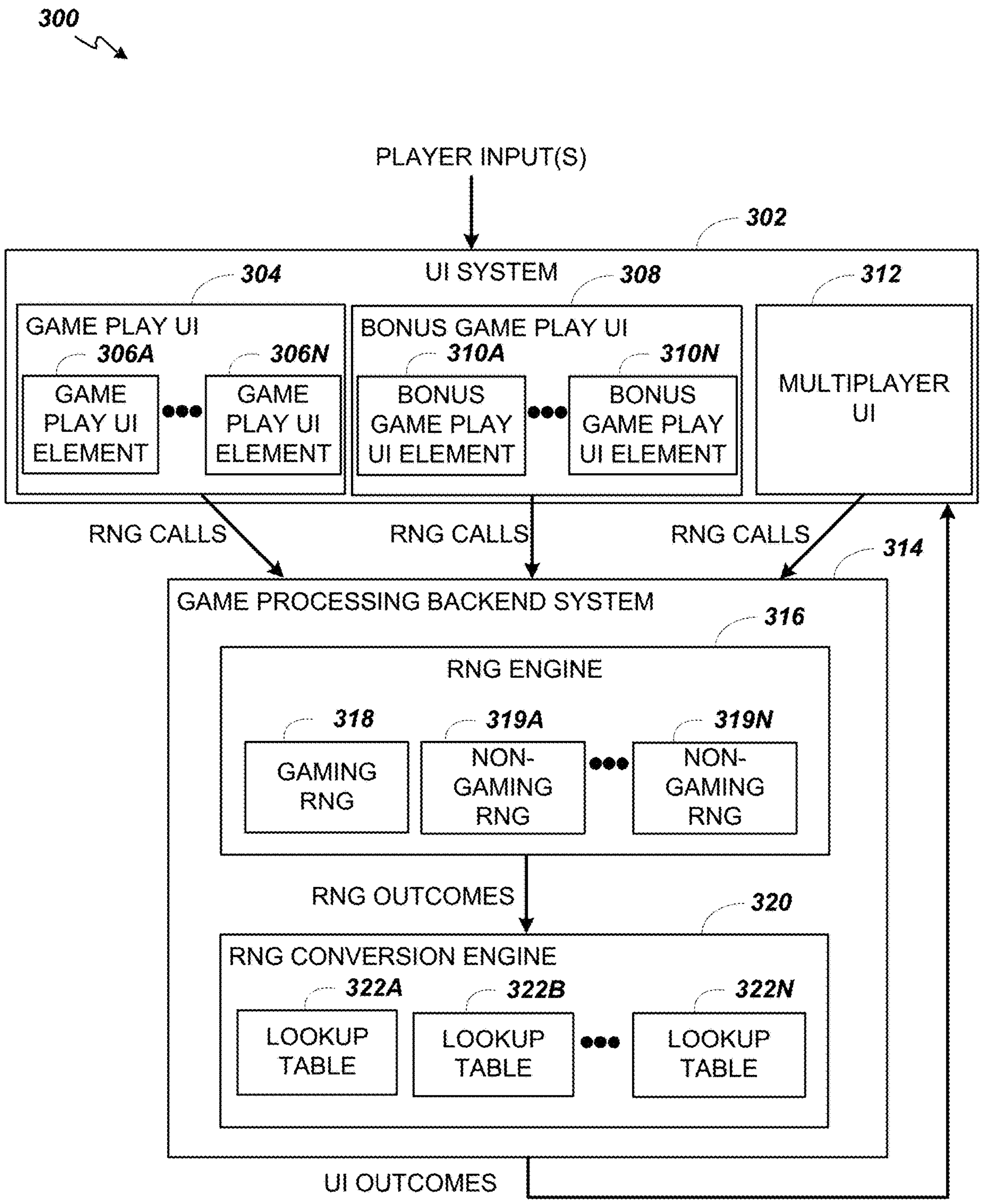
FIG. 3 illustrates, in block diagram form, an implementation of a game processing architecture algorithm that implements a game processing pipeline for the play of a game in accordance with various implementations described herein.

FIG. 3 illustrates, in block diagram form, an implementation of a game processing architecture 300 that implements a game processing pipeline for the play of a game in accordance with various implementations described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more implementations, at least some of the game play UI element 306A-306N are similar to the bonus game play UI elements 310A-310N. In other implementations, the game play UI element 306A-306N can differ from the bonus game play UI elements 310A-310N.

FIG. 3 also illustrates that UI system 302 could include a multiplayer UI 312 purposed for game play that differs or is separate from the typical base game. For example, multiplayer UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 could corresponds to RNG 212 or hardware RNG 244 shown in FIG. 2A. As previously discussed with reference to FIG. 2A, gaming RNG 318 often performs specialized and non-generic operations that comply with regulatory and/or game requirements. For example, because of regulation requirements, gaming RNG 318 could correspond to RNG 212 by being a cryptographic RNG or pseudorandom number generator (PRNG) (e.g., Fortuna PRNG) that securely produces random numbers for one or more game features. To securely generate random numbers, gaming RNG 318 could collect random data from various sources of entropy, such as from an operating system (OS) and/or a hardware RNG (e.g., hardware RNG 244 shown in FIG. 2A). Alternatively, non-gaming RNGs 319A-319N may not be cryptographically secure and/or be computationally less expensive. Non-gaming RNGs 319A-319N can, thus, be used to generate outcomes for non-gaming purposes. As an example, non-gaming RNGs 319A-319N can generate random numbers for generating random messages that appear on the gaming device.

The RNG conversion engine 320 processes each RNG outcome from RNG engine 316 and converts the RNG outcome to a UI outcome that is feedback to the UI system 302. With reference to FIG. 2A, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to updating the appropriate UI, the player may subsequently provide additional player inputs to initiate a subsequent game instance that progresses through the game processing pipeline.

Figure 4:
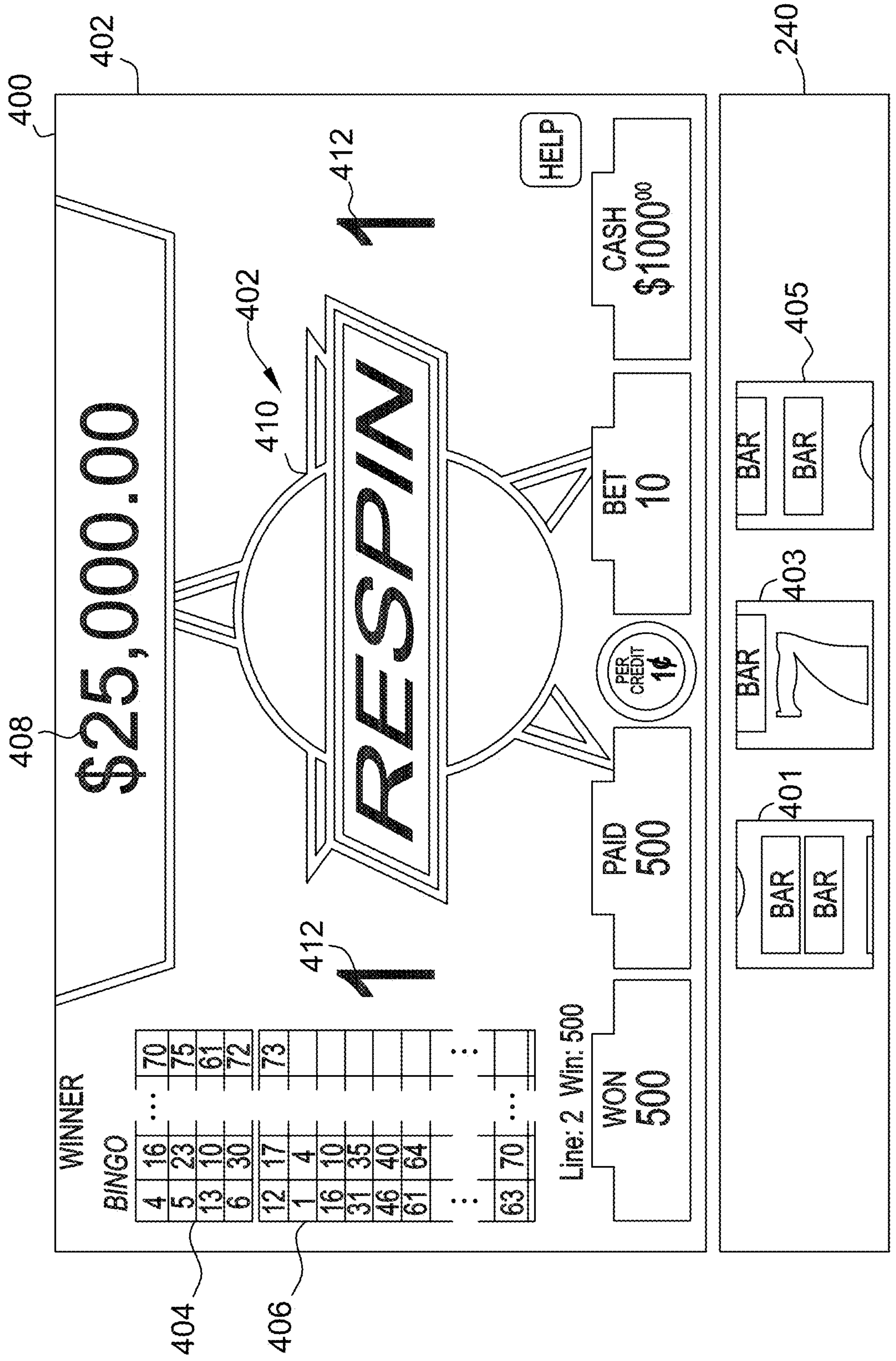
FIG. 4 is a is a is a screenshot of an example free play bonus game played on an EGM shown at FIG. 1, in which an initial numerical indicium is displayed during a free spin count-up.

FIG. 4 is a schematic diagram of an example free play bonus game 400 (or "free spin bonus game") played on an EGM 104A-104X (shown at FIGS. 1 and 2). In various embodiments, free play bonus game 400 may be played as a primary or base game and/or as a bonus game that is triggered from the primary game. In other words, the functionality described herein with respect to free play bonus game 400 may be implemented in any suitable wagering game, including in any primary game as well as in any bonus game. However, in the illustrated embodiment, free play bonus game 400 is a bonus game.

Accordingly, a wagering game may be initiated on an EGM 104A-104X. Specifically, a player may fund the wagering game via bill validator 234 and/or ticket reader 224. Once funded, a primary game, which may include a plurality of reels 401, 403, and/or 405, each including a plurality of symbols, may appear on a display, such as on primary game display 240. These reels 401-405 may be physical reels and/or virtual reels and may range from one reel to five or more reels in number. As used herein, physical reels are mechanical in nature and may be physically rotated during gameplay. In contrast, virtual reels are rendered or visually created by game controller 202 on a display, such as primary game display 240, and are merely animated to give the appearance of being spun.

In various embodiments, the wagering game may include any suitable game of chance. For example, in at least some embodiments, the wagering game is a Class II bingo game. However, in other embodiments, the wagering game may be a Class III "Las Vegas Style" wagering game. Specific details of the type of wagering game used are not central to an understanding of the present disclosure. However, additional detail related to at least one embodiment (e.g., an embodiment employing a bingo-based or Class II primary game) may be obtained with reference to U.S. Published Patent Application No. 2012/0270638, filed Apr. 20, 2011, and entitled GAMING MACHINE WITH FREE PLAY BONUS MODE PRESENTING ONLY WINNING OUTCOMES, which is hereby incorporated by reference in its entirety.

During play of the primary game, game controller 202 may determine that a free play trigger condition is satisfied, and, in response, initiate free play bonus game 400. In various embodiments, a free play trigger condition may include any suitable trigger condition, such as, for example, generation by RNG 212 of a random number within a range of random numbers and/or a specific or preselected symbol combination occurring on the reels in the primary game. For example, in a Class III embodiment, the free play trigger condition may be satisfied when a preselected or predefined symbol combination occurs on reels 401-405 in the primary game, such as, for example, a symbol combination associated with a game award that is greater than or equal to a predetermined award value and/or when the predetermined award value is capable of being broken up or segmented into a threshold number of free spins.

In some embodiments, and as described in additional detail below, the free play trigger condition may be satisfied when a number of winning patterns in a bingo-based primary game (e.g., a Class II embodiment) exceeds a threshold number of winning patterns. In other embodiments, the free play trigger condition may be satisfied when an award associated with the one or more bingo winning patterns is greater than or equal to a predetermined award value and/or when the predetermined award value is capable of being broken up or segmented into a threshold number of free spins. It will, however, be appreciated that these free play trigger conditions are merely examples and that other free play trigger conditions may be implemented as well.

When free play bonus game 400 is initiated, game controller 202 may award one or more free spins of the reels displayed in the primary game. The number of free spins awarded may be based upon any suitable criterion or group of criteria, such as, for example, the value of the random number generated by RNG 212, the symbol combination occurring on reels 401-405 during the primary game, and the like.

In addition, and in at least one embodiment (e.g., where the wagering game is a bingo game), the number of free spins awarded may correspond to a number of winning bingo patterns occurring in the primary game. For example, a bingo card provided in the primary game may be evaluated against a ball call to determine that the bingo card includes a number of winning patterns. Each winning pattern may be awarded as, or result in, a free spin in free play bonus game 400. These award amounts may be stored in a memory, and further may be arranged in an increasing or ascending order. The free spins may then be presented in an increasing or ascending order of award amount. As an example, a bingo card provided in the primary game may be evaluated against a ball call to determine that there are eight winning patterns occurring on the bingo card, and each of these eight winning patterns may result in an individual free spin in free play bonus game 400, such that, in this case, eight free spins are awarded. In addition, as described herein, free play bonus game 400 may not be triggered unless the number of winning patterns awarded in the primary game exceeds a threshold number of winning patterns, such as, for example four winning patterns, eight winning patterns, etc.

In another Class II embodiment, the number of free spins awarded may correspond to a number of segments or portions of a subdivided bingo game award. For example, when the free play trigger condition is satisfied by a bingo game award of sufficient value (as described above), the bingo game award may be subdivided into a plurality of smaller awards, each of which may be associated with a free spin. As an example, a bingo game award of 1,000 credits may be subdivided into eight smaller awards of 125 credits each. Each of the eight smaller awards may be associated with an individual free spin, and each of these individual free spins may, as described herein, provide or award one of the eight smaller awards.

In at least one Class III embodiment, the number of free spins awarded may correspond to a number of segments or portions of a subdivided game award in the Class III base game. For example, when the free play trigger condition is satisfied by a primary game award of sufficient value (as described above), the game award may be subdivided into a plurality of smaller awards, each of which may be associated with a free spin, and provided in conjunction with one of the smaller sub-awards.

In at least one Class III embodiment, the number of free spins awarded may be randomly determined based on a random number selection process that uses a weighted table that includes various quantities of free spins along with their weights.

In another Class II or Class III embodiment, each free spin may correspond to a particular game outcome, such as any winning and/or non-winning game outcome. For example, winning and/or non-winning game outcomes may, in some embodiments, result in free spins. However, and in at least some embodiments, only winning game outcomes may result in free spins. Moreover, as described above, in some embodiments, game controller 202 may simply (randomly) award a number of free spins.

Thus, free play bonus game 400 may be implemented in Class II and Class III embodiments, and a free play trigger condition and/or a number of free spins awarded during free play bonus game 400 may be variously determined. In addition, the methods for determining the free play trigger condition and/or a number of free spins described above are merely illustrative, and it will be appreciated that other approaches are contemplated and within the scope of the present disclosure.

With continuing reference to FIG. 4, a count-up animation 402 (e.g., as opposed to a count-down) of the number of free spins awarded during free spin bonus game 400 may be displayed, such as, for example, on secondary game display 242. The count-up animation 402 may be displayed to build player excitement, such as, for example, where the player knows that a number of free spins have been awarded based upon the appearance of count-up animation 402 and/or the appearance of free spin bonus game 400 on secondary game display 242, but where the player does not know specifically how many free spins have been awarded, i.e., the total quantity of free spins awarded.

In addition to count-up animation 402, a bingo card 404 may be displayed. As described above, the number of free spins awarded may correspond to a number of winning patterns occurring on bingo card 404. As those of skill will appreciate, the number of winning patterns may be determined based upon a ball call 406, which may be displayed as well. Moreover, a table or database of winning patterns may be stored in a computer memory of any of EGMs 104A-104X, such as memory 208, which may be a tangible, non-transitory, computer-readable memory.

Accordingly, to determine a number of winning patterns, bingo card 404 may be "daubed" by game controller 202 based upon the list of numbers included in ball call 406. The daubed bingo card 404 may also be displayed, such as, for example, by highlighting each daubed number. Once bingo card 404 is daubed, game controller 202 may compare the numbers daubed on bingo card 404 to every winning pattern in the database of winning patterns. Further, as described above, game controller 202 may identify and translate the number of winning patterns occurring on bingo card 404 to a number of free spins in free spin bonus game 400. For example, if eight winning patterns are identified on bingo card 404, game controller 202 may award eight free spins. Likewise, game controller 202 may not trigger free spin bonus game 400 (or display count up animation 402) until the number of winning patterns exceeds a threshold number of winning patterns. To this end, game controller 202 may, in some embodiments, count, or determine a number of, winning patterns and/or free spins awarded.

In various embodiments, certain patterns that have a large payout (that exceeds a threshold amount), may be split up into two or more spin awards. In various embodiments, certain patterns that have a small payout (that is lesser than a threshold amount), may be combined into a single spin award.

In the example embodiment, a game award 408, capable of being won, may also be displayed in conjunction with free spin bonus game 400. Game award 408 may be any suitable type of game award, such as, for example, and as shown, a jackpot award and/or a progressive jackpot award. In other embodiments, game award 408 may be one or more of an additional free spin or an additional plurality of free spins, and/or an additional or different bonus game different from free spin bonus game 400. In some cases, game award 408 may correspond to a change or alteration of a symbol or symbols displayed on reels 401-405 (e.g., from the primary game and displayed on primary game display 240). In another embodiment, game award 408 may cause a multiplier or multiplication factor to be added to a monetary award in the primary game and/or to the jackpot in free spin bonus game 400. Further, in at least some embodiments, game award 408 may cause one or more wild symbols to be added to reels 401-405 in the primary game.

Thus, game award 408 may generally include any suitable award and/or game feature capable of presentation as an award or bonus. As a result, although a variety of award options are described above, it will be appreciated that any suitable game award and/or game feature may be presented and/or offered in conjunction with free spin bonus game 400.

In various embodiments, count-up animation 402 may include several components. For example, count-up animation 402 may include a central animation 410 and/or a numerical indicium 412, which may appear, depending upon a presentation desired, in one or more locations within free spin bonus game 400.

In some embodiments, free play bonus game 400 may not be triggered unless a number of winning outcomes (and thus free spins) exceeds a threshold number of winning outcomes and/or free spins. In contrast, and in other embodiments, free play bonus game 400 may be triggered if fewer than the threshold number of winning outcomes and/or free spins are awarded or if a different (lower) threshold number of winning outcomes and/or free spins are awarded. However, where that is the case, game award 408 may not be provided or triggered unless the number of winning outcomes and/or free spins exceeds the threshold number of winning outcomes and/or free spins. Moreover, the number of free spins awarded may exceed the number of free spins needed to trigger game award 408.

Numerical indicium 412 may be displayed and incremented, from an initial indicium number, through a plurality of intermediate indicia numbers, and to a final indicium number, to visually depict the count-up of free spins awarded in free spin bonus game 400. Specifically, numerical indicium 412 is animated as part of count-up animation 402 to visually depict an increasing number of free spins. As described above, a player may not know how many free spins have been awarded in free spin bonus game 400 but may watch as numerical indicium 412 is incremented from an initial indicium number to a final indicium number. The player may, however, know that a threshold number of free spins correspond to game award 408. For example, the player may review a paytable of the wagering game to gain an understanding of the number of free spins required to achieve game award 408.

In the example embodiment, each free spin may be provided and displayed on primary game display 240. Specifically, each time numerical indicium 412 increases or is incremented, the reels displayed on primary game display 240 may be spun or re-spun. In this manner, each re-spin may be concurrently or simultaneously displayed with each increment of numerical indicium 412, making it clear that each of the free spins awarded to the player is causing or generating a re-spin of the reels. Moreover, a delay between the display of each indicium may be imposed to increase player excitement and the like.

In addition, and as described above, each free spin may, in the example embodiment, correspond to a winning game outcome (such as a winning bingo pattern). Game controller 202 may, as a result, determine an award associated with each free spin (or re-spin) based upon the winning game outcome. For example, if a winning bingo pattern associated with a first free spin corresponds to an award of 100 credits (e.g., based upon a bingo paytable), game controller 202 may re-spin the reels during the first free spin, and provide an award in association with the first free spin of 100 credits. Thus, each free spin of the reels may be a winning spin, and an award provided during each free spin may correspond to an award associated with the winning bingo pattern (or more broadly, a winning game outcome) mapped or corresponding to the free spin.

In various embodiments, game controller 202 may determine award amounts and corresponding game outcomes to be displayed prior to the initiation of free spin bonus game 400 (e.g., the free spin count-up round), as described in additional detail herein. These award amounts may be stored in a memory, and further may be arranged in an increasing or ascending order. The free spins may then be presented in an increasing or ascending order of award amount. For example, in at least some embodiments, each free spin may be associated with an increasingly larger award amount, such that with each successive free spin, the player receives an increasingly larger award. In one example, a first free spin may be associated with 100 credits, a second free spin may be associated with 200 credits, and a third free spin may be associated with 300 credits. Each award amount may be stored in a memory, such as in an ascending and/or descending order. In addition, during play of bonus game 400, the first free spin, associated with the smallest number of credits (e.g., 100 credits) may be awarded to the player first. Next, following the first free spin, the free spin associated with 200 credits may be provided to the player, and lastly, the free spin associated with 300 credits may be provided to the player.

In some embodiments, one or more discrete game awards, such as minor, mini, major, and/or grand game awards may be triggered or provided in association with different numbers or tiers of free spins. For example, a minor award (associated with a first value) may be triggered in response to a first number of free spins awarded (e.g., less than the number needed to trigger game award 408). Similarly, a mini award (associated with a second value greater than the first value) may be triggered in response to a second number of free spins awarded (greater than the first number of free spins), and so on through the grand award, which may be less than or the same as game award 408.

In various embodiments, one or more tiers of free spins may trigger a variety of features. As used herein a "tier" of free spins may generally indicate a number or group of free spins, such as, for example, a group of two or four free spins. A total number of allotted or awarded free spins may thus be divided into one or more tiers. For example, where a tier comprises two free spins and a player is awarded a total of eight free spins, as described above, the eight free spins may be divided into four tiers of free spins of two free spins per tier.

Accordingly, in one embodiment, a first tier of free spins may trigger a first progressive jackpot (e.g., a first progressive jackpot in a tier of progressive jackpots), and a second tier of free spins may trigger a second progressive jackpot in the tier of jackpots, and so on. Similarly, one or more tiers of free spins may be associated with one or more multipliers or multiplication factors. For example, a first tier of free spins may trigger the application of a first multiplication factor to an in-game feature, such as one or more game awards occurring in the primary game, one or more jackpots or other awards occurring in free play bonus game 400, and the like. Likewise, a second tier of free spins may trigger the application of a second, larger, multiplication factor in the same manner.

Further still, one or more tiers of free spins may trigger the application of a multiplier and/or another game enhancement for a predefined period of time. For instance, a first tier of free spins may cause any award provided to increase in value for the period of time, a second tier of free spins may cause any award to increase even further, and so on. In addition, in some embodiments, a player reaching one or more tiers of free spins may be provided as a game enhancement that causes all wagers placed by the player (even minimum wagers) to function as maximum and/or increased wagers. Similarly, one or more tiers of free spins may trigger additional bonus games, and these may be provided at any point during gameplay, such as at the end of a free play bonus game 400 and/or during free play bonus game 400.

Moreover, in some embodiments, one or more tiers of free spins may be associated with one or more collectible items, such as, for example, one or more collectible or persistent game items that can be collected and saved by a player for redemption at a later stage of gameplay. In one example, a player may collect golden eggs when different levels or tiers of free spins are achieved. These golden eggs may persist during gameplay, such that the player is encouraged to collect a specified number of golden eggs in exchange for an award or prize. In addition, in at least some embodiments, numerical indicium 412 may count-down from a particular value. For example, as described herein, numerical indicium 412 may first increase to a specified value or number of free spins (e.g., four free spins) and, thereafter, decrease or count-down to a lower value. In various embodiments, a count-down may signify, for example, that the player has received a number of free spins, but that the number needed to trigger game award 408 was not reached.

Figure 5:
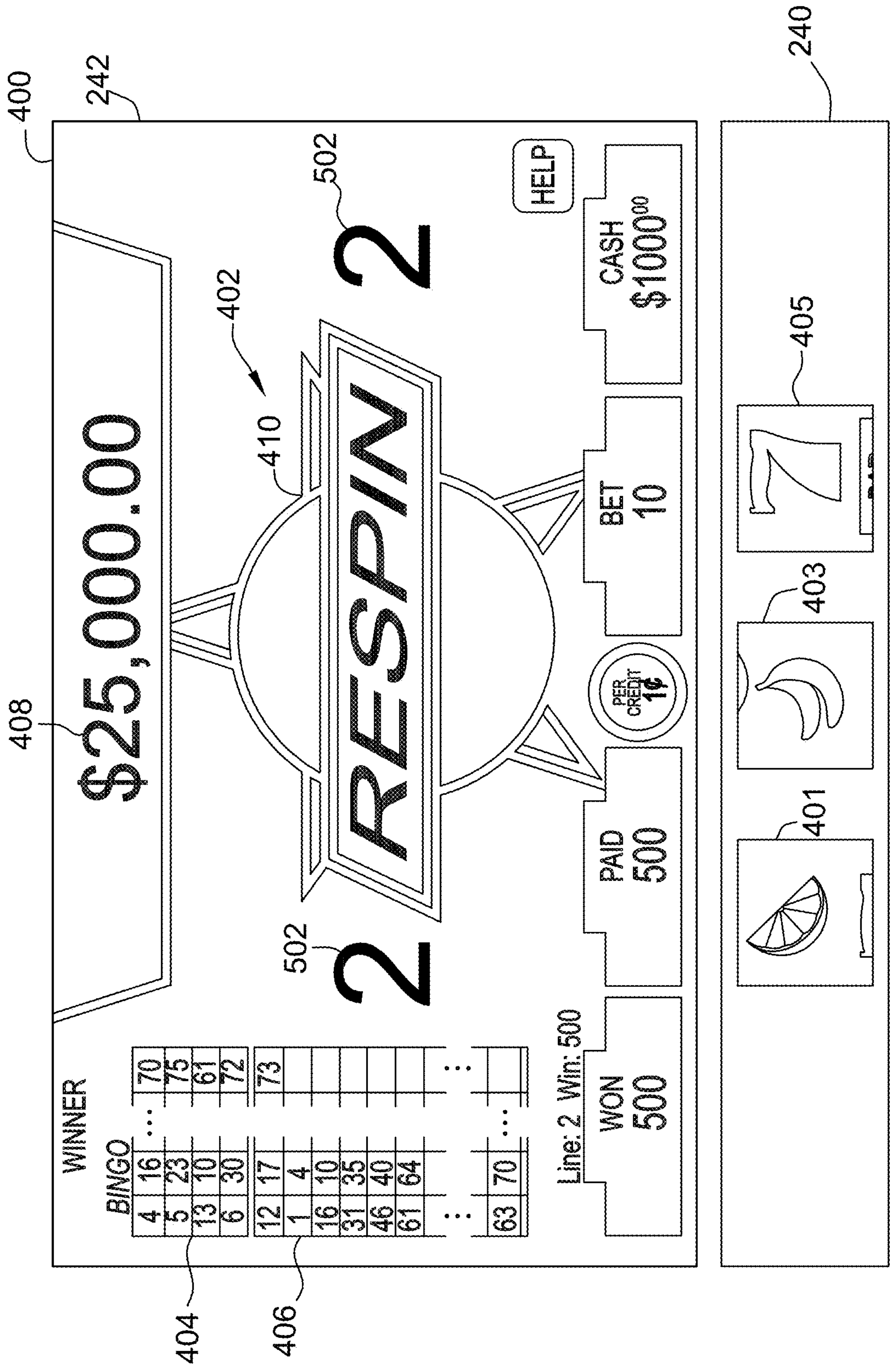
FIG. 5 is a screenshot of the example free play bonus game, in which a first intermediate numerical indicium is displayed during the free spin count-up.
Figure 6:
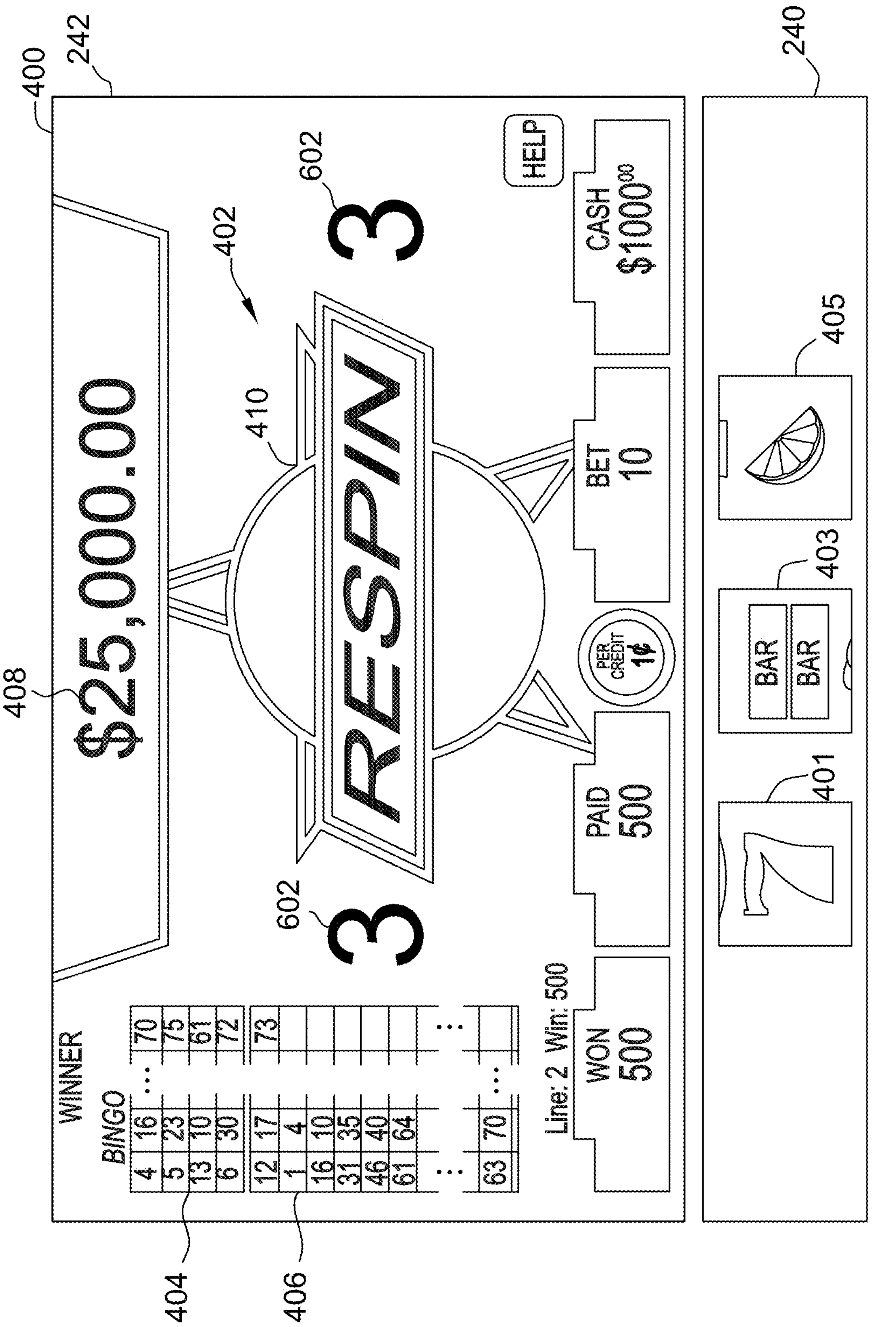
FIG. 6 is a screenshot of the example free play bonus game, in which a second intermediate numerical indicium is displayed during the free spin count-up.

As such, game controller 202 may generate an initial free spin of the reels displayed on primary game display 240 and display, in conjunction with the initial free spin, numerical indicium 412 (which may also be referred to herein as an "initial numerical indicium"). In the example embodiment, the initial free spin is a first free spin, and the initial numerical indicium 412 is the number one ("1"). As the count-up continues, game controller 202 may generate a plurality of intermediate free spins of the reels and display, in conjunction with each intermediate free spin, a plurality of intermediate numerical indicia. These intermediate free spins may count-up from the initial free spin, such that they proceed in ascending numerical order, such as through ordinals as follows: "2," "3," "4," etc. FIGS. 5 and 6 depict such a count-up.

Figure 7:
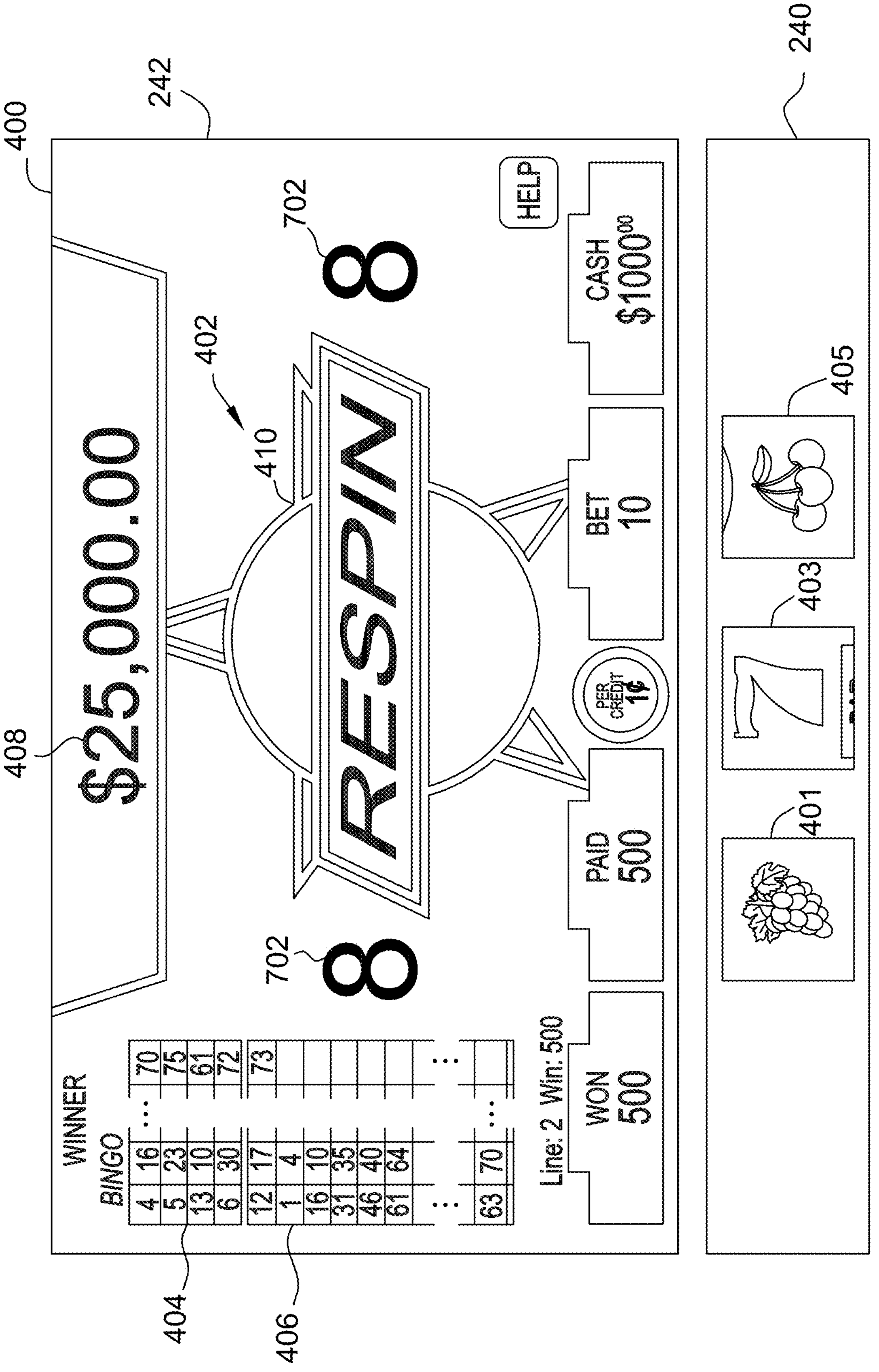
FIG. 7 is a screenshot of the example free play bonus game, in which a final numerical indicium is displayed during the free spin count-up.

Specifically, FIG. 5 shows an intermediate numerical indicium 502 of "2." Similarly, FIG. 6 shows an intermediate numerical indicium 602 of "3." It will be appreciated that any number of intermediate numerical indicia may be displayed, depending upon a number of free spins awarded. Continuing, as shown at FIG. 7, game controller 202 may generate a final free spin of a number of free spins needed to trigger game award 408 and display, in conjunction with the final free spin of the number of free spins needed to trigger game award 408, a final numerical indicium 702. In the example embodiment, final numerical indicium 702 is associated with the number "8." The count-up through the ordinals "4," "5," "6," and "7" is not shown in the Figures; however, it will be appreciated that such a count-up would occur in the progression from an indicium of "1" to an indicium of "8." Moreover, as described herein, any suitable number of free spins, and therefore any suitable number of numerical indicia, may be used to illustrate the free spin count-up. Further still, the numerical indicia displayed may continue to increase beyond final numerical indicium 702 after game award 408 is provided, such as, for example, when the player is awarded more free spins than are needed to trigger game award 408.

Figure 8:
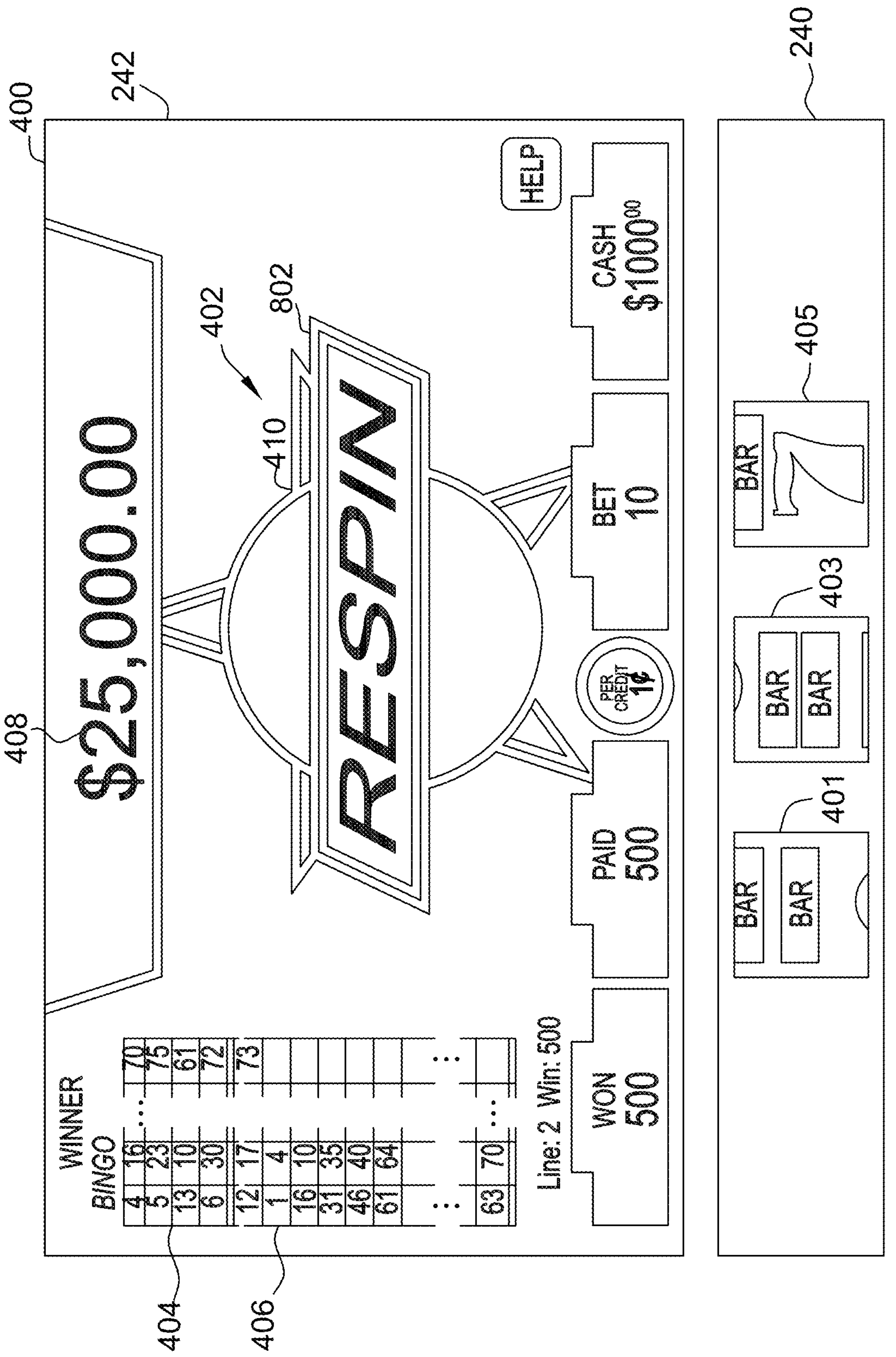
FIG. 8 is a screenshot of the example free play bonus game, in which a bonus animation is displayed during the free spin count-up.

In the example embodiment, and as shown with reference to FIG. 8, when a free spin in excess of the threshold number of free spins is reached (in this case eight free spins), a "BONUS" animation 802 may be displayed to so indicate. In addition, game award 408 may be provided or awarded to the player in conjunction with display of final numerical indicium 702 and/or in conjunction with display of the "BONUS" animation 802, which may follow shortly in response to presentation of final numerical indicium 702. As described above, the player may not necessarily know how many free spins have been awarded. However, the player may know what the threshold number of free spins is (in this case eight free spins), which may cause increased excitement as the count-up advances towards the threshold number. In the example shown, game award 408 may be a jackpot award, such as a linked progressive jackpot award. When game award 408 is won, the value of the award, or a portion thereof, may be added to the player's credit balance, and the player may be provided an option to cash out and/or return to the primary game.

Figure 9:
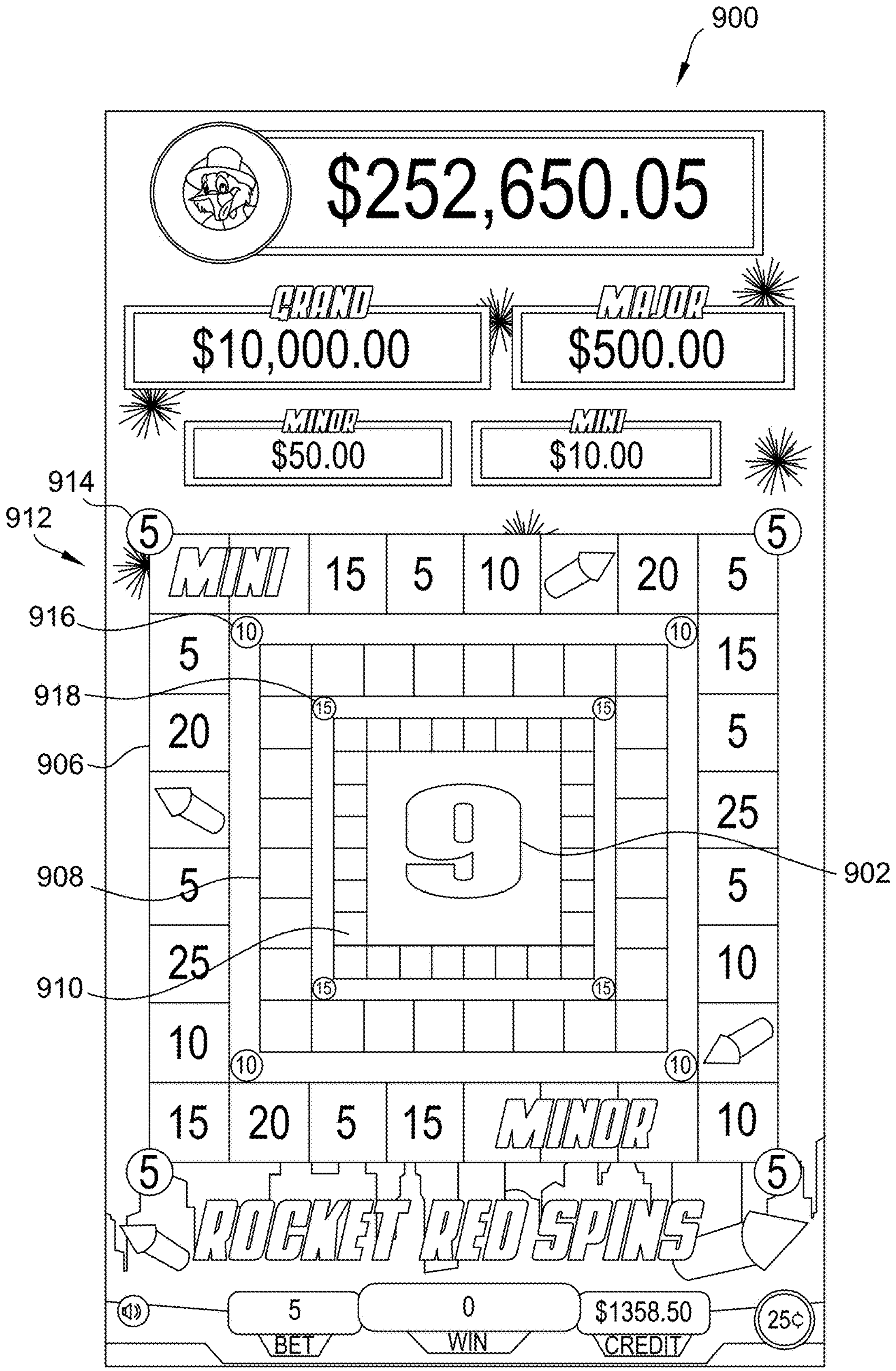
FIG. 9 is a screenshot of an example secondary bonus game played on an EGM shown in FIG. 1, including a plurality of bonus game boards, in which numerical indicium is decremented during a free spin count-down.

Referring now to FIG. 9, in some embodiments, when a free spin equal to or in excess of the threshold number of free spins is reached (in this case eight free spins), an additional bonus game may be initiated. As used herein, the additional bonus game may also be referred to as a "free spins run" or "secondary" bonus game. Moreover, as described above, although eight free spins are illustrated, it will be appreciated that the threshold number of free spins for triggering the secondary bonus game may vary as desired.

Accordingly, in the example embodiment, during the free spin count-up, as described above, a plurality of free spins may be "banked" by the player, where, as used herein, the term "banked" means that the free spins provided to the player are counted or aggregated for comparison against a threshold number of free spins required to trigger the secondary bonus game. In the running example, if the player is awarded eight free spins during the free spin count-up, the number of free spins banked by the player may be eight as well.

In addition to the tier structures described elsewhere herein, in various embodiments, the secondary bonus game may also utilize tiers of banked free spins. For example, a variety of secondary bonus games may be triggered or provided in association with different numbers or tiers of free spins. For example, a first secondary bonus game may be triggered in response to a first number of banked free spins. Similarly, a second, different, secondary bonus game may be triggered in response to a second number of banked free spins (greater than the first number of banked free spins), and so on through any desirable number of tiers.

Further, in some examples, the second different bonus game may be provided in addition to the first bonus game, in response to the second number of banked free spins.

In addition, and as described herein, different tiers of banked free spins may also be associated with different bonus awards (e.g., jackpots, such as mini, minor, etc.), multipliers, and the like. Accordingly, banked free spins may cause a variety of different awards and/or features, including different secondary bonus games, to occur depending, for example, upon the number of banked free spins accumulated by the player, where, in at least some embodiments, greater numbers of banked free spins may generally result in greater prizes, different secondary bonus games having improved or superior return to player relative to bonus games triggered from lower tiers, and the like.

In various embodiments, free play bonus game 400 and/or secondary bonus games may be funded in a variety of ways. For example, in at least one embodiment, both the free play bonus game 400 and the secondary bonus game may be funded from winning patterns from a single bingo card, such as bingo card 404. More particularly, in at least some embodiments, if the player achieves one or more bingo patterns, as described above, totaling an award value, a first portion of the award value may be paid to the player in increments using a plurality of free spins during the free play bonus game 400, as described above. A second portion of the total award may, on the other hand, be reserved and not paid to the player during the free play bonus game 400. Rather, the second portion of the total award may be paid to the player during the secondary bonus game, e.g., as part of one or more additional free spins, in a bulk payment or bulk increment, during one or more rounds of play of the secondary bonus game, which may as described below, include any suitable bonus game, and the like.

To illustrate, in one example, a player may achieve one or more bingo patterns using bingo card 404 and ball call 406 during the primary or base game, where the one or more patterns are associated with a total award of five-hundred credits. A first portion of the total award, such as three-hundred credits, may be applied during the free play bonus game 400 and paid out during the free spin count-up. A second portion of the award, such as two-hundred credits, may be reserved and paid to the player during the secondary bonus game. In at least one embodiment, one or more additional ball calls may also occur during free play bonus game 400, such as for example, to supplement the first portion of the total award paid out during free play bonus game 400 and/or as an alternative to divvying the total award between the primary game and free play bonus game 400.

In various embodiments, the total award may be partitioned in any manner desired, such as 50/50, 60/40, and/or according to any other suitable partitioning methodology, such as to provide a satisfying payout in both the free play bonus game 400 as well as the secondary bonus game. As a result of the partitioning of the total award into a first and second portion, at least one technical improvement associated with the embodiments described herein is that game controller 202 may determine a portion of the payout for both bonus games ahead of time, prior to initiation of either game, such as during the base game and/or as free play bonus game 400 is initiated. Stated another way, game controller 202 may predetermine an optimal award structure ahead of time to construct a storyline or optimal payout based upon a total award, e.g., to prevent giving a player too small an award during either the free play bonus game 400 and/or during the secondary bonus game, and the like.

In some embodiments, the free play bonus game 400 and the secondary bonus game may be funded from two or more duplicate patterns on bingo card 404. For example, in some embodiments, a first winning bingo pattern (e.g., four corners) and a second winning bingo pattern (e.g., four corners) may be identical. However, a first award may be associated with the pattern in the event the player daubs or achieves the pattern in a first number of balls called during the ball call 406, and a second award may be associated with the same pattern in the event the pattern is daubed in a second number of balls called. To illustrate, in one example, the four corners pattern may pay fifty credits if it is achieved in thirty-two balls called or less. Likewise, the four corners pattern may pay twenty-five credits if it is achieved in thirty-five balls called or less. For convenience, the second of the two identical four corners patterns (i.e., four corners in thirty-five balls or less) may be referred to as a "super four corners" pattern.

Accordingly, in at least one embodiment, to fund the free play bonus game 400 as well as the secondary bonus game, if the player achieves both the four corners pattern in thirty-two balls or less as well as the super four corners pattern in thirty-five balls or less (the latter outcome occurring of necessity when the initial four corners pattern is daubed in thirty-two balls or less), a first portion of the total award, such as the fifty-credits associated with the four corners pattern, may be provided to the player during the free play bonus game 400. Likewise, the remaining twenty-five credits earned from the super four corners pattern may be provided to the player during play of the secondary bonus game.

In at least some embodiments, the free play bonus game 400 and secondary bonus game may be funded from multiple bingo cards. For example, during play of the secondary bonus game, one or more additional bingo cards may be introduced and evaluated to determine one or more awards during one or more secondary bonus games. In at least one embodiment, the bingo cards introduced during the one or more secondary bonus games may be associated with guaranteed awards or payouts, such that the player is guaranteed to be provided an award during the secondary bonus games played using the additional bingo cards.

Similarly, in at least some embodiments, the one or more additional bingo cards may be associated with different winning patterns and/or awards depending, for example, on a tier achieved during the secondary bonus game, whereas described herein, in at least some embodiments, the tier achieved may be based on a number of free spins banked during the free spin count-up from free play bonus game 400. For example, as the number of banked free spins increases, a larger or increasing number of bingo cards may be introduced during the secondary bonus game. Likewise, the return to player associated with bingo cards introduced during the secondary bonus game may be increased as the number of banked free spins increases.

In addition to the funding mechanisms described above, in at least some embodiments, an additional wager may also be required in order to make the secondary bonus game available. For example, a player may need to place an additional, or ante, wager to unlock the secondary bonus game. However, in some embodiments, no ante wager is necessary, and the secondary bonus game is available without any additional wager from the player. Likewise, in at least some embodiments, although no ante wager is required, a player may select an option to place an ante wager, where the placement of such a wager may, for example, increase the chances that the count-up achieved by the player is higher (e.g., sufficient to trigger the secondary bonus game), and the like.

In various embodiments, any of a variety of secondary bonus games may be initiated in response to accumulation of a threshold number of banked free spins during the free spin count-up. Several such examples are described below with reference to FIGS. 9-12. In general, the free spin bonus games described with reference to FIGS. 9-12 may operate substantially the same way as free spin bonus game 400 (e.g., a free spin count-up may be performed), except, as described in additional detail below, that the secondary bonus games provided in each of the respective FIGS. 9-12 may vary. Likewise, the visual appearance and graphics provided may vary. However, in each of FIGS. 9-12, as described below, a free spin count-up is performed and a secondary bonus game is triggered based on the number of free spins banked during the count-up.

Accordingly, with reference to FIG. 9, an example embodiment of a free spin bonus game 900 (including a secondary bonus game 912) is shown. During free spin bonus game 900, a free spin-count-up may be performed using a numerical indicium 902, which may be centrally located relative to a plurality of concentric boards, such as a first board 906, a second board 908, and a third board 910.

In the example embodiment, each board 906-910 may specify a threshold number of banked free spins (e.g., a tier of banked free spins) that, if achieved during the free spin count-up, may be sufficient to trigger a secondary bonus game 912 that uses the board 906-910 earned in association with the number of banked free spins. In the example shown, first board 906 specifies a first threshold 914 number of banked free spins at its corners. Likewise, second board 908 specifies a second threshold 916 number of banked free spins, and third board 910 specifies a third threshold 918 number of banked free spins. As a result, game controller 202 may select a board 906-910 for use during the secondary bonus game 912 based upon the banked number of free spins from the count-up and the threshold number 914-918 specified at the corners of the board 906-910.

Following selection of one of the boards 906-910, a selection indicium, such as a reticle or another suitable identifier, may move from space to space around the selected board 906-910, such as based upon a bingo outcome and/or otherwise randomly. It may be appreciated that the space that the reticle lands or stops on may include a prize or award, which may be provided to the player during the secondary bonus game.

In addition, in at least some embodiments, the numerical indicium 902 may be decremented from the final value (e.g., nine in the example shown), and each time the indicium 902 is decremented, the reticle or other selection indicium may move around the respective board 906-910 to award the player another prize or award. Moreover, in at least some embodiments, the portion of the total award used to fund the secondary bonus game (described above) may be further partitioned or divided (equally or unequally) into the number of banked free spins, such that each time the indicium 902 is decremented, a sub-portion of the total award allocated to the secondary bonus game 900 is provided to the player. As a result, in at least some embodiments, gameplay may include both a free spin count-up as well as a banked free spin count-down.

Figure 10:
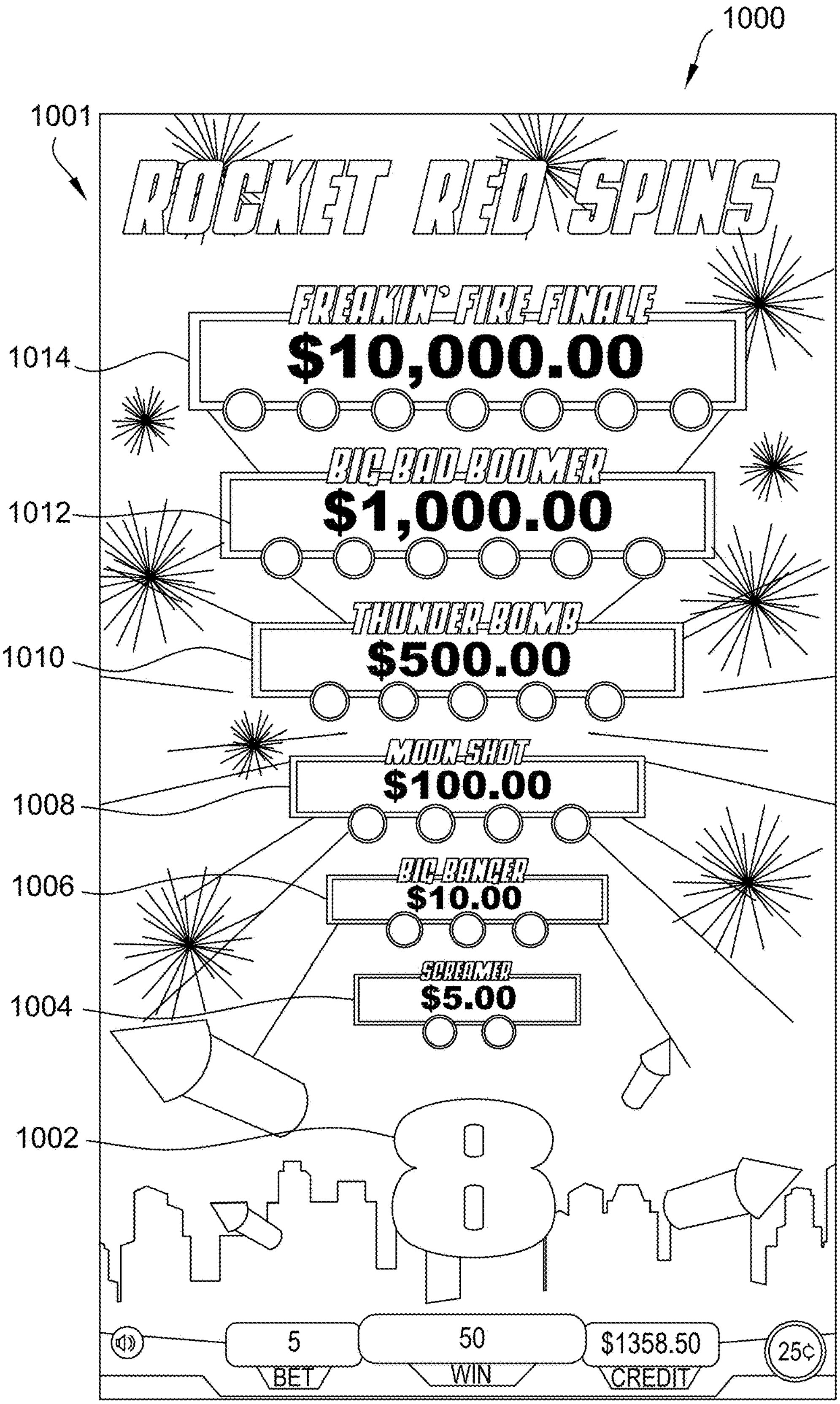
FIG. 10 is a screenshot of an example secondary bonus game played on an EGM shown in FIG. 1, including a plurality of jackpot awards, in which numerical indicium is decremented during a free spin count-down.

With reference to FIG. 10, an example embodiment of a free spin bonus game 1000 (including a secondary bonus game 1001) is shown. During free spin bonus game 1000, a free spin-count-up may be performed using a numerical indicium 1002, which may be displayed relative to a plurality of jackpot gauges, such as a first jackpot gauge 1004, a second jackpot gauge 1006, a third jackpot gauge 1008, a fourth jackpot gauge 1010, a fifth jackpot gauge 1012, and/or a sixty jackpot gauge 1014. As shown, each jackpot gauge 1004-1014 may be associated with a respective jackpot, such as a respective progressive jackpot, which may be displayed near the respective gauge 1004-1014 and awarded if the respective gauge 1004-1014 is filled, as described below.

In the example embodiment, each gauge 1004-1014 may include a threshold number of slots, each of which may need to be filled in order for the award associated with the respective gauge 1004-1014 to be provided to the player. It will be appreciated that the slots may be filled in a variety of ways. However, in the example embodiment, the numerical indicium 1002 indicating the number of banked free spins earned by the player during the base game may be decremented, as described herein, from the final numerical indicium (e.g., of eight in the example of FIG. 10) to the initial numerical indicium (of one), and each time the indicium 1002 is decremented, a firework may be "launched" (e.g., the display device controlled to simulate launching of the firework) and/or another graphic may be provided on the display.

For example, if the firework explodes on or near a respective gauge 1004-1014, one of the slots associated with the gauge 1004-1014 may be filled. If enough fireworks explode near the gauge, all the slots associated with the gauge 1004-1014 may be filled, resulting, in at least some embodiments, in the jackpot award associated with the gauge 1004-1014 being provided to the player. As a result, as shown, jackpots associated with larger values may also be associated with gauges 1004-1014 having larger numbers of slots to ensure that larger jackpots are more difficult to obtain as well as to ensure that smaller jackpots are more easily obtained (e.g., to prevent player frustration with the game).

Moreover, in at least some embodiments, the portion of the total award used to fund the secondary bonus game 1001 (described above) may be further partitioned or divided (equally or unequally) into the number of banked free spins, such that each time the indicium 1002 is decremented, a sub-portion of the total award allocated to the secondary bonus game 1001 is applied to launch a firework. In this implementation, a player may not be provided each sub-portion of the award. Rather, the sub-portions may be used to launch fireworks, which may result in payment of a jackpot award, as described above. However, in some circumstances, at least some of the portion of the total award allocated to the secondary bonus game 1001 may not be paid to the player. It can, in addition, be seen that in at least some embodiments, gameplay may include both a free spin count-up as well as a banked free spin count-down.

Figure 11A:
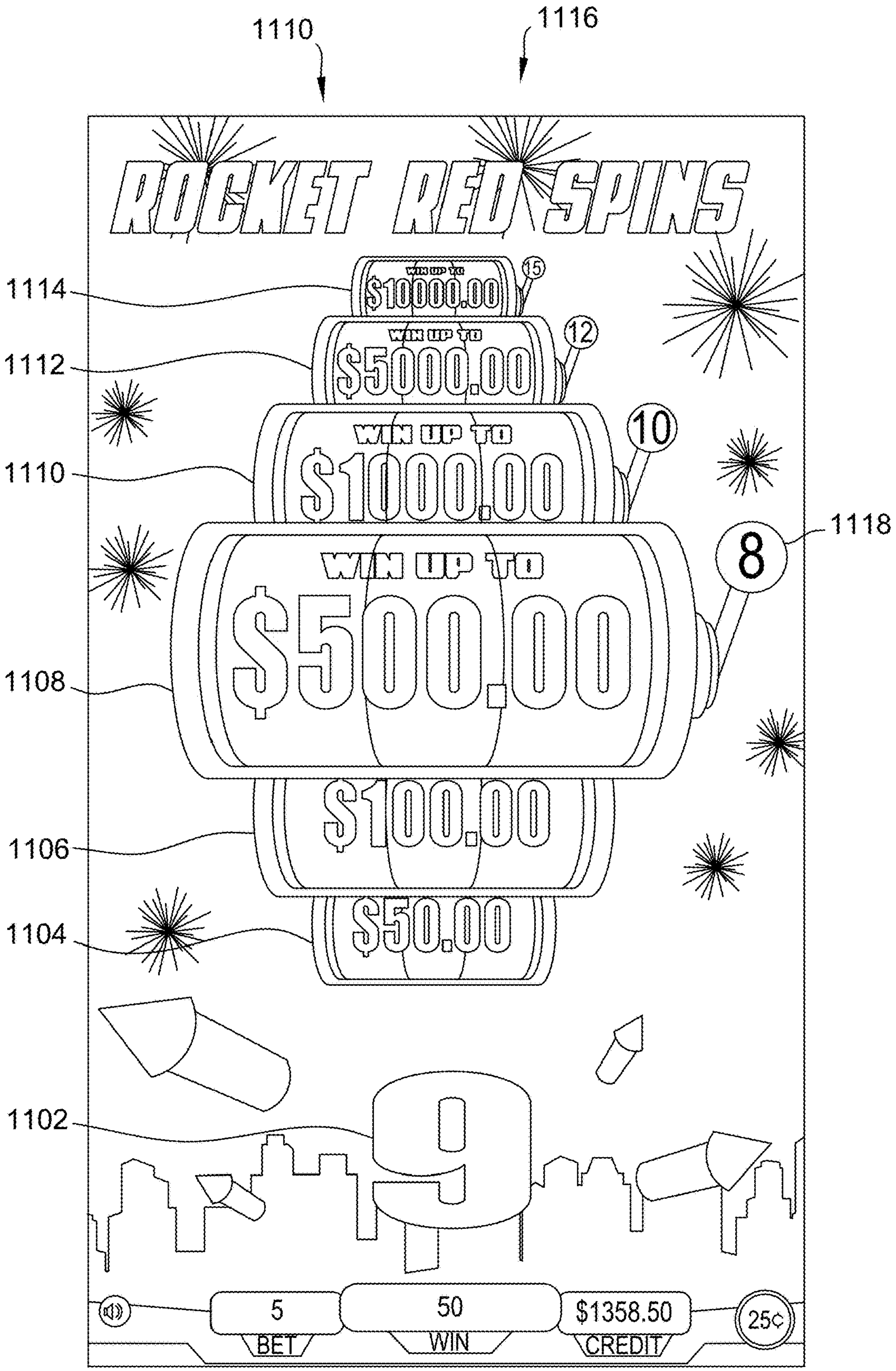
FIG. 11A is a screenshot of an example secondary bonus game played on an EGM shown in FIG. 1, including a plurality of jackpot awards, each associated with a threshold number of banked free spins.
Figure 11B:
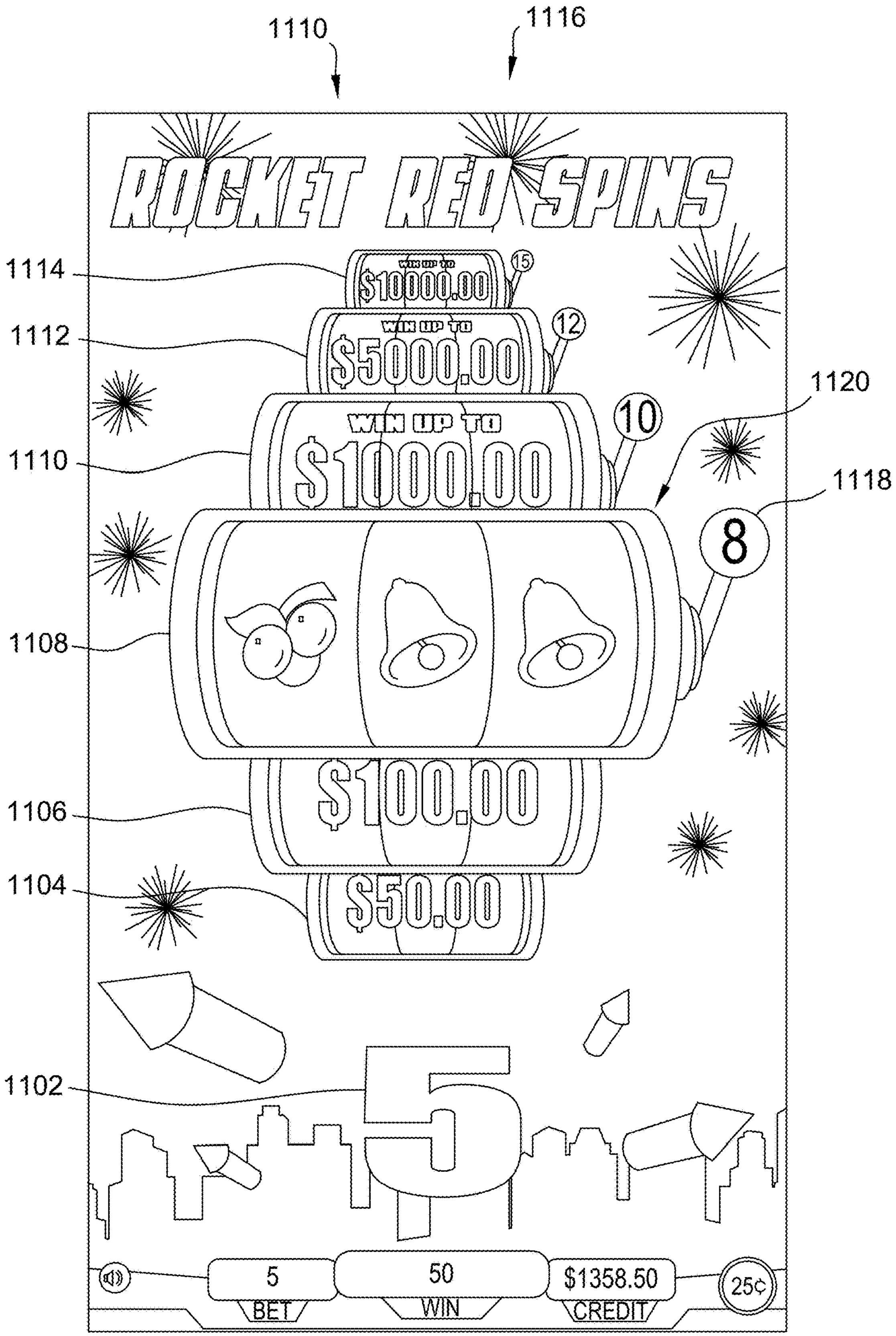
FIG. 11B is a screenshot of the secondary bonus game shown in FIG. 11A, in which a jackpot award is selected based on a number of banked free spins, and in which a plurality of reels are displayed in associated with the secondary bonus game.

With reference to FIGS. 11A and 11B, an example embodiment of a free spin bonus game 1100 (including a secondary bonus game 1116) is shown. During free spin bonus game 1100, a free spin-count-up may be performed using a numerical indicium 1102, which may be displayed in association with a series of jackpot awards, such as a first jackpot award 1104, a second jackpot award 1106, a third jackpot award 1108, a fourth jackpot award 1110, a fifth jackpot award 1112, a sixth jackpot award 1114, and so on. As shown with reference to FIG. 11A, prior to selection of a given jackpot award 1104-1114, jackpot awards 1104-1114 may be displayed like a "rolodex" and/or in another suitable fashion.

In the example embodiment, each jackpot award 1104-1114 may specify a threshold number of banked free spins (e.g., a tier of banked free spins) that, if achieved during the free spin count-up, may be sufficient to trigger a secondary bonus game 1116 that uses or permits play for the jackpot award 1104-1114 earned in association with the number of banked free spins. In the example shown, at least some of the jackpots 1104-1114 specify a respective number of banked free spins at their corners. For example, jackpot 1108 is associated with eight banked free spins, as shown by the indicator 1118 shown therewith. During gameplay, game controller 202 may thus select a jackpot award 1104-1114, such as from the "rolodex," which may be simulated to spin or rotate, for use during the secondary bonus game 1116 based upon the banked number of free spins from the count-up and the indicator (e.g., indicator 1118) specified in association with each of the jackpot awards 1104-1114.

As best shown with reference to FIG. 11B, following selection of one of the jackpot awards 1104-1114, a plurality of reels 1120 may be displayed. For example, the reels 1120 may replace the selected jackpot award 1104-1114. The reels 1120 may be spun, stopped, and evaluated to determine (e.g., based upon a random outcome, such as a random bingo outcome) whether the combination of symbols displayed on the reels 1120 corresponds to the jackpot 1104-1114 selected previously and/or any other winning or non-winning game outcome.

In addition, in at least some embodiments, the numerical indicium 1102 may be decremented from the final value (e.g., eight in the example shown), and each time the indicium 1102 is decremented, reels 1120 may be re-spun and stopped to determine whether any winning outcome has landed, including, for example, the jackpot award 1104-1114 selected previously. Moreover, in at least some embodiments, the portion of the total award used to fund the secondary bonus game 1116 (described above) may be further partitioned or divided (equally or unequally) into the number of banked free spins, such that each time the indicium 1102 is decremented, a sub-portion of the total award allocated to the secondary bonus game 1116 is provided to the player. As a result, it can be seen that in at least some embodiments, each outcome of the secondary bonus game 1116 is a winning outcome, as well as that gameplay may include both a free spin count-up as well as a banked free spin count-down.

Figure 12A:
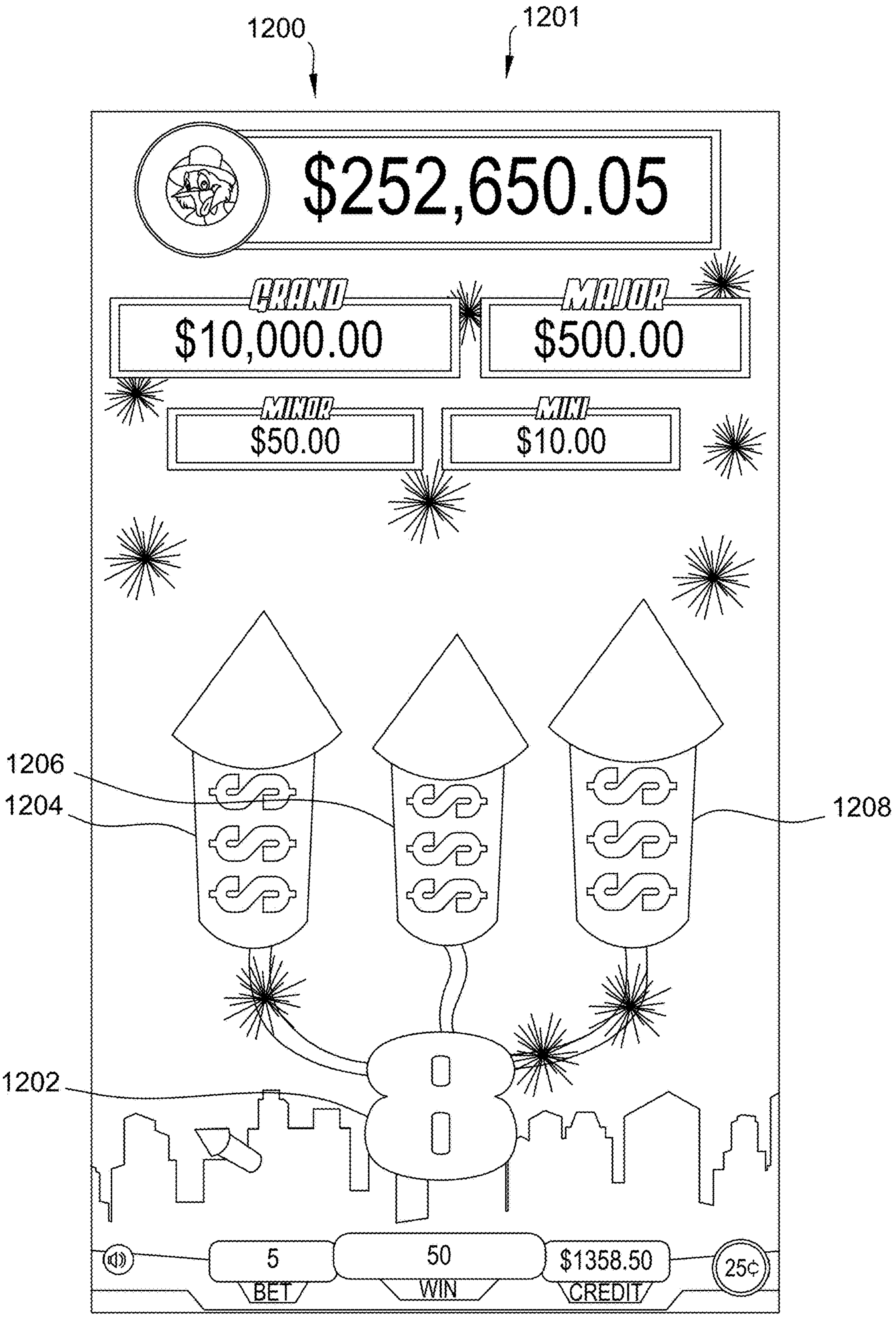
FIG. 12A is a screenshot of an example secondary bonus game played on an EGM shown in FIG. 1, including a plurality of animated symbols, such as fireworks, in which one or more animated symbols can be activated during a free spin count-down.
Figure 12B:
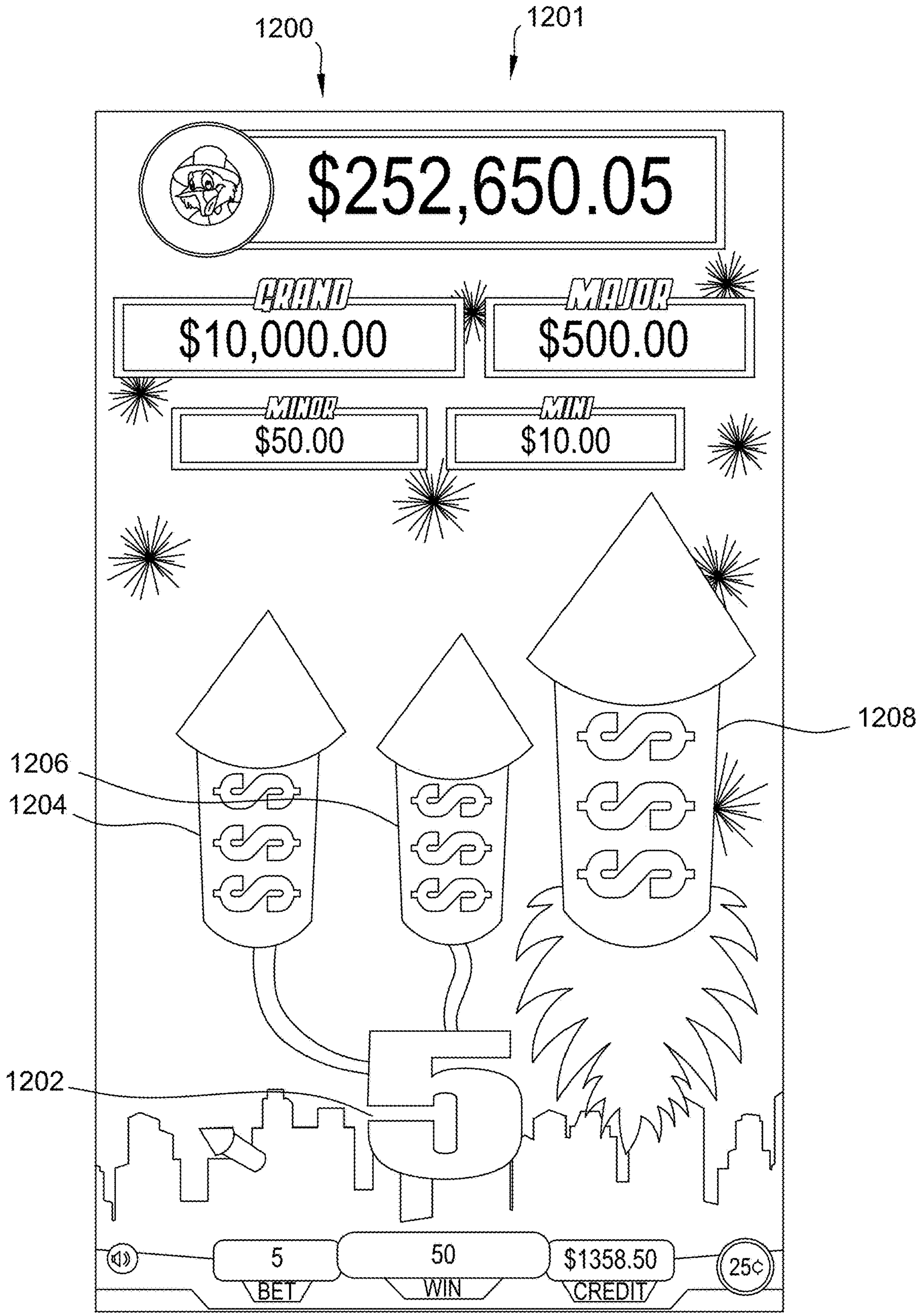
FIG. 12B is a screenshot of the secondary bonus game shown in FIG. 12A, in which an animated symbol, such as firework, is activated during a free spin count-down.

With reference to FIGS. 12A and 12B, an example embodiment of a free spin bonus game 1200 (including a secondary bonus game 1201) is shown. During free spin bonus game 1200, a free spin-count-up may be performed using a numerical indicium 1202, which may be displayed in association with a plurality of graphical elements, such as in this example, a plurality of fireworks, including a first firework 1204, a second firework 1206, a third firework 1208, etc.

As shown with reference to FIG. 12A, prior to selection of a given firework 1204-1208, the fireworks 1204-1208 may be displayed as being connected to numerical indicium 1202 by respective fuses. In some embodiments, each firework 1204-1208 may include or display an award that can be won if the firework 1204-1208 explodes, as described below. Similarly, in some embodiments, the fireworks 1204-1208 may include one or more "metamorphic" elements, such as one or more visual elements that change the appearance of fireworks 1204-1208 to indicate that a probability that the fireworks 1204-1208 may be ignited is increasing or has increased (e.g., "shaking" fireworks, "swelling" fireworks, and the like).

During gameplay, the numerical indicium 1202 may be decremented from the final value (e.g., eight in the example shown), and each time the indicium 1202 is decremented, a spark may be displayed on one of the fuses leading from numerical indicium 1202 to a respective firework 1204-1208. If the spark travels along the respective fuse and ignites the firework 1204-1208, the firework may be displayed to ignite or explode, and a credit award, a jackpot award, and/or another suitable award may be provided to the player. In some cases, a firework may appear to fizzle or sputter out, which may result in no award being provided.

Moreover, in at least some embodiments, the portion of the total award used to fund the secondary bonus game 1201 (described above) may be further partitioned or divided (equally or unequally) into the number of banked free spins, such that each time the indicium 1202 is decremented, a sub-portion of the total award allocated to the secondary bonus game 1201 is provided to the player. As a result, it can be seen that in at least some embodiments, each outcome of the secondary bonus game 1201 is a winning outcome, as well as that gameplay may include both a free spin count-up as well as a banked free spin count-down. However, as described herein, in at least some embodiments, not every play of the secondary bonus game 1201 may result in a winning outcome (e.g., fireworks that are "duds" and the like).

One advantage (and specific improvement to the technical field of electronic gaming) of providing a first count up bonus game and a secondary bonus game is that a variableness or variety of game outcomes may be increased by associating a number of earned free spins with the first bonus game and the second bonus game. For example, as described above, the game award may be distributed out in variable tiers, whereby for example the awards are increased or otherwise varied among successive free spins. Moreover, in some embodiments, the distribution of the awards for each spin of the bonus games may be determined at least in part by a random output, such as a ball call in a Class II game or by an RNG output in a Class III game. For example, in some embodiments a data structure or lookup table may be stored on may be stored in a memory device of EGM 104A-104X and/or in another memory device, such as a memory device of a server system 106-114. The lookup table may direct award distributions for each spin of a free spin bonus based on the number of awarded or banked free spins and further based on the random output. After a game award and number of free spins are determined, the random output may be obtained and used in combination with the lookup table to determine distribution percentages of the game award for each of the free spins in the first bonus game and/or the second bonus game.

Figure 13:
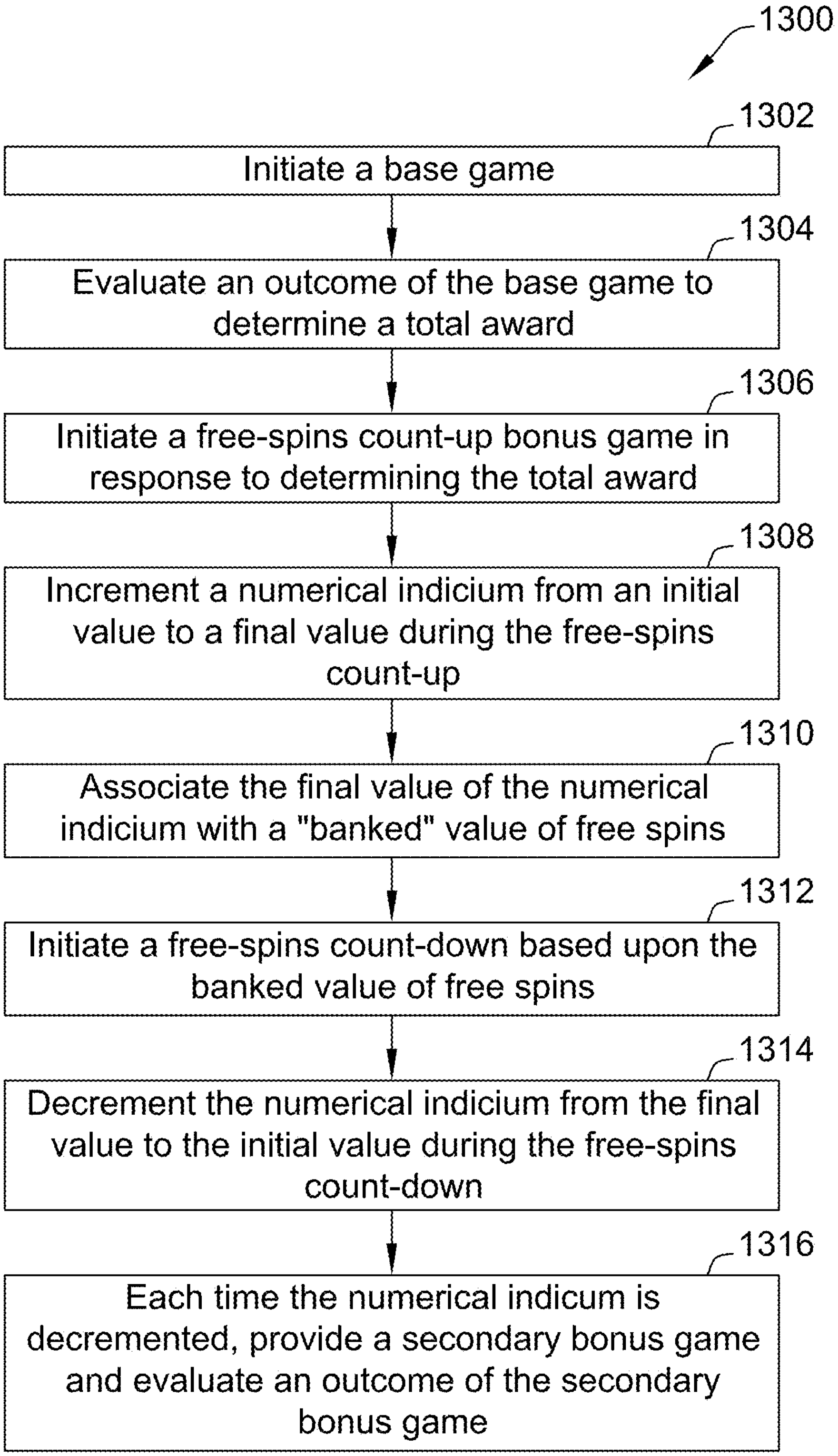
FIG. 13 is a flowchart illustrating an example embodiment of a process for implementing a wagering game that includes a free-spins count-up as well as a subsequent free-spins count-down, as described with reference to FIGS. 4-12B.

FIG. 13 is a flowchart illustrating an example embodiment of a process 1300 for implementing a wagering game that includes a free-spins count-up as well as a subsequent free-spins count-down. Accordingly, in at least some embodiments, a primary or base wagering game may be initiated, such as in response to receiving a wager from a player (step 1302). An outcome of the wagering game may, in addition, be evaluated, such as to determine a total award to be provided to the player (step 1304).

As described above, in some embodiments, all and/or a portion of the total award may be provided to the player in association with a free-spins count-up game 400, which may be triggered in response to the outcome of the wagering game being a winning outcome (e.g., triggering the total award) (step 1306). During the free-spins count-up game 400, a numerical indicium may be incremented from an initial indicium value (e.g., a value of "1) to a final indicium value that represents the number of free spins awarded to the player as a result of the total award (step 1308). In some embodiments, the number of free spins may increase as a function of the value of the total award (e.g., as the total award increases, so also the number of free spins may increase).

Moreover, in at least some embodiments, the final numerical indicium may be associated with (and/or represent) a total, or "banked," number of free spins (step 1310). Stated another way, the number of free spins awarded to the player based upon the value of the total award may be stored in a memory device of EGM 104A-104X and/or in another memory device, such as a memory device of a server system 106-114. As a result, and as described herein, the number of free spins awarded to the player may be "banked" and used in the subsequent free-spins count-down.

At the conclusion of the free-spins count-up game 400 (e.g., once the final numerical indicum is reached during the count-up), a free-spins count-down may be initiated, such as for example, based upon and/or using the banked number of free spins from the free-spins count-up game 400 (step 1312). In some embodiments, the numerical indicium may be decremented from the final numerical indicium toward the initial numerical indicium (step 1314). In response to decrementing the numerical indicium, and each time the indicium is decremented, a secondary bonus game may be executed or implemented, and an outcome of the secondary bonus game may be evaluated to determine whether to provide a secondary award to the player (step 1316).

As described herein, in some embodiments, a portion of the total award from the primary game may be allocated to the secondary bonus game and provided to the player in portions, such as in association with each, or some, of the secondary game outcomes. In some embodiments, as described, a portion of the total award may be provided to the player during the free-spins count-up bonus game 400, and another portion may be saved and provided to the player during the secondary free-spins count-down game.

In addition to these features, and as described, in at least some embodiments, the free-spins count-down game may not be initiated unless and/or until the banked number of free spins exceeds a threshold value. Accordingly, in at least some embodiments, the banked number of free spins may be compared to a threshold number of free spins prior to initiating the free-spins count-down. In other embodiments, no such requirement exists, and the free-spins count-down initiates automatically following completion of the count-up. A free spin count-up bonus game as well as a subsequent banked free spin count-down secondary bonus game are thus described herein. More particularly, the free spin count-up game may be triggered during play of a base game, such as a base bingo game, during which a total bingo award may be divided into a plurality of smaller awards provided during one or more free spins. In addition, a numerical indicium, such as a count-up and count-down indicium, may be provided. The indicium may, in some embodiments, count up from an initial value to a final value based on the number of free spins determined from the total bingo award. Likewise, when the indicium reaches a maximum or final value, the value may be regarded as indicating a number of "banked" free spins.

The number of banked free spins may be compared to one or more threshold values to determine, in some embodiments, whether a secondary or "red spins run" bonus game may be initiated. If, for example, the number of banked free spins is greater than or equal to such a threshold value, the secondary bonus game may be initiated, during which, for example, the indicium may be decremented from the final value back down toward the initial value. Each time the indicium is decremented, the secondary bonus game may be played, such as for example, by spinning a plurality of reels, launching a group of fireworks, moving a reticle on a bonus game board, and the like.

Moreover, in some embodiments, a total award may be allocated prior to initiation of the free play bonus game and/or the secondary bonus game. For example, in some embodiments, a first portion of the total award may be allocated for distribution or payment to the player during the free play bonus game, such as using the plurality of free spins contributing to the free spin count-up. Likewise, a second portion of the total award may be allocated to the secondary bonus game for distribution, at least in part, to the player during the count-down initiated from the secondary bonus game. In addition to the features and example games described above, in at least some other embodiments, the free-spins count-down game may not be initiated unless and/or until the banked number of free spins provided in the count-up game exceeds a threshold value stored in memory and there is a satisfactory outcome on a random determination of whether the secondary free-spins count-down game will be initiated, wherein the random determination may include an output from an RNG and a subsequent lookup in a pay table stored in memory. Accordingly, in at least some embodiments, the banked number of free spins may be compared to a threshold number of free spins and a random determination of whether a player will be awarded the secondary free-spins count-down game prior to initiating the free-spins count-down. Several such examples are described below with reference to FIGS. 14A-16. In general, the free spin bonus games described with reference to FIGS. 14A-16 may operate substantially the same way as free spin bonus game 400 (e.g., a free spin count-up may be performed) and the example secondary bonus game described above with respect to FIGS. 9-12. However, as with the example secondary bonus game described above with respect to FIGS. 9-12, the visual appearance and graphics provided may vary. Further, as described below, a free spin count-up is performed and a secondary bonus game is triggered based on the number of free spins banked during the count-up and a successful outcome on a random determination.

In the embodiments illustrated in FIGS. 9-12, the indicum may be located within an orb or other animation. If a secondary free-spins count-down game is initiated, the reels may change to a set of reels comprising credit symbols and each time the indicium is decremented, the reels may spin. The credit symbols may comprise sticky symbols that, when displayed, hold in place for the remainder of the secondary free-spins count-down game. The credit symbol may comprise a credit value or identify a jackpot (e.g., as mini, minor, etc.). The goal may be to obtain as many credit symbols as possible. Further, in some embodiments, the total number of credit symbols at the end of the secondary bonus game is compared to a threshold and if it is greater than or equal to the threshold, a multiplier may be awarded. For example, in some embodiments, if all of the symbol positions within a matrix comprise a credit symbol, a 2×-5× multiplier may be awarded.

Figure 14A:
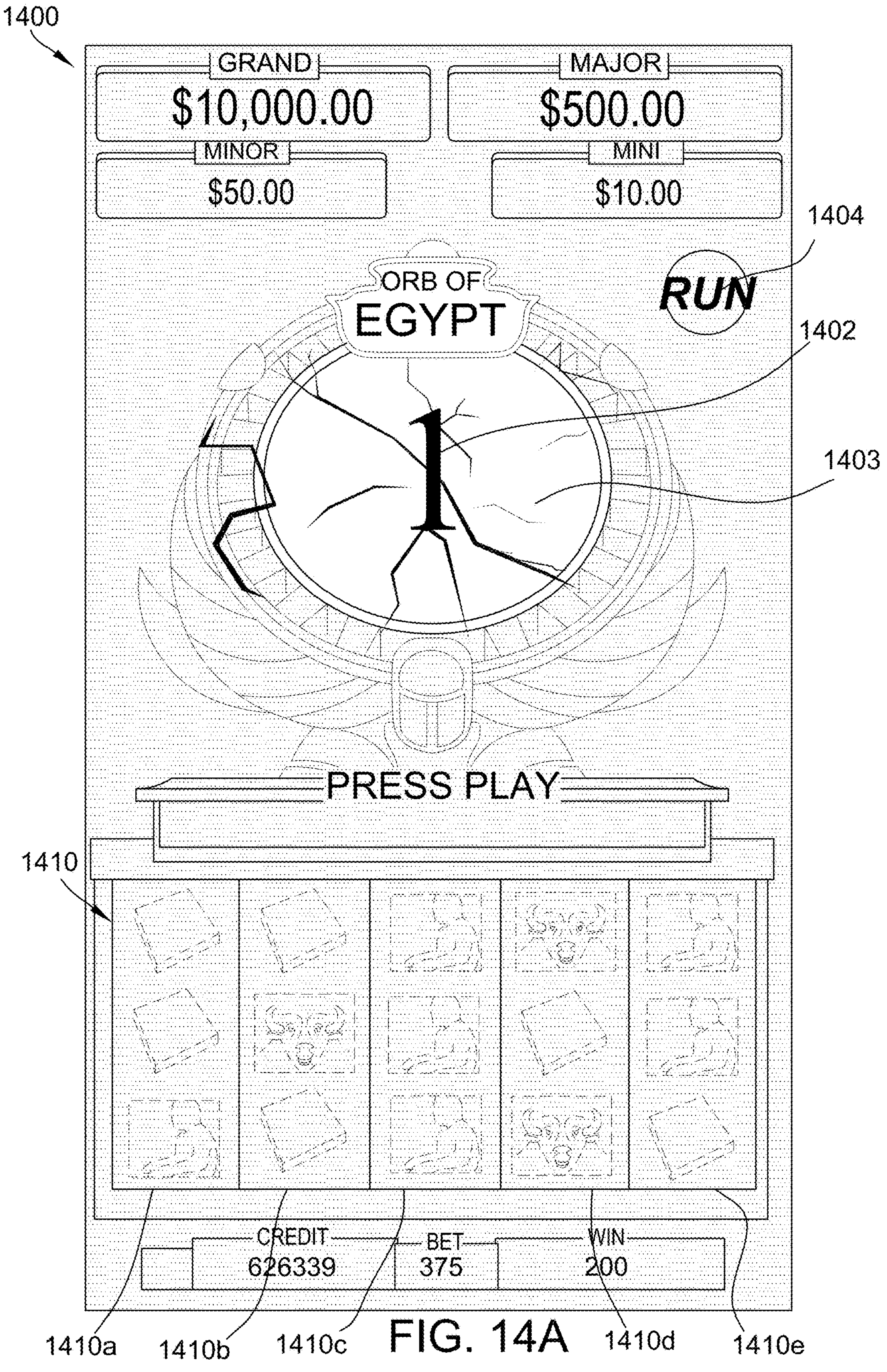
FIG. 14A is a screenshot of another example free play bonus game played on an EGM shown at FIG. 1, in which an initial numerical indicium located with an orb is displayed during a free spin count-up.

Referring now to FIG. 14A, in some embodiments, when a free spin equal to or in excess of the threshold number of free spins is reached (for example, three free spins) and there is a satisfactory outcome on a random determination, an additional bonus game may be initiated. In some embodiments, the random determination may be made when evaluating an outcome of the base game to determine a total award. As used herein, the additional bonus game may also be referred to as a "red spin run", "free spins run" or "secondary" bonus game. Moreover, as described above, although three free spins are illustrated, it will be appreciated that the threshold number of free spins for triggering the secondary bonus game may vary as desired.

Accordingly, in the example embodiment, during the free spin count-up, as described above, a plurality of free spins may be "banked" by the player, where, as used herein, the term "banked" means that the free spins provided to the player are counted or aggregated for comparison against a threshold number of free spins required to trigger the secondary bonus game. In the running example, if the player is awarded three free spins during the free spin count-up, the number of free spins banked by the player may be three as well. In some embodiments, the display may turn red during the banked free spins to indicate to the player that the respective spin is a banked spin.

In addition to the tier structures described elsewhere herein, in various embodiments, the secondary bonus game may also utilize tiers of banked free spins. For example, a variety of secondary bonus games may be triggered or provided in association with different numbers or tiers of free spins and a satisfactory outcome on one or more random determinations (e.g., using an RNG output and a lookup table). For example, a first secondary bonus game may be triggered in response to a first number of banked free spins and at least one satisfactory outcome on one or more random determinations. Similarly, a second, different, secondary bonus game may be triggered in response to a second number of banked free spins (greater than the first number of banked free spins) and at least one satisfactory outcome on one or more random determinations, and so on through any desirable number of tiers. Further, in some examples, the second, different bonus game may be provided in addition to the first bonus game, in response to the second number of banked free spins and at least one satisfactory outcome on one or more random determinations.

In addition, and as described herein, different tiers of banked free spins may also be associated with different bonus awards (e.g., jackpots, such as mini, minor, etc.), multipliers, and the like. Accordingly, banked free spins may cause a variety of different awards and/or features, including different secondary bonus games, to occur depending, for example, upon the number of banked free spins accumulated by the player and at least one satisfactory outcome on one or more random determinations, where, in at least some embodiments, greater numbers of banked free spins may generally result in greater prizes, different secondary bonus games having improved or superior return to player relative to bonus games triggered from lower tiers, and the like.

In various embodiments, free play bonus game 400 and/or secondary bonus games may be funded in a variety of ways. For example, in at least one embodiment, both the free play bonus game 400 and the secondary bonus game may be funded from winning patterns from the evaluation of a single bingo card, such as bingo card 404. More particularly, in at least some embodiments, if the player achieves one or more bingo patterns, as described above, totaling an award value, a first portion of the award value may be paid to the player in increments using a plurality of free spins during the free play bonus game 400, as described above. A second portion of the total award may, on the other hand, be reserved and not paid to the player during the free play bonus game 400. Rather, the second portion of the total award may be paid to the player during the secondary bonus game, e.g., as part of one or more additional free spins, in a bulk payment or bulk increment, during one or more rounds of play of the secondary bonus game, which may, as described below, include any suitable bonus game, and the like. For example, in some embodiments, the second portion awarded during a secondary bonus game comprises a credit amount that the game would have awarded on a last spin of the free play bonus game should the game not have entered into a secondary bonus game (e.g., the number of banked free spins less than the threshold and/or unsuccessful outcome on the random determination).

In addition, and in at least one embodiment, both the free play bonus game 400 and the secondary bonus game may be funded from winning patterns from the evaluation of a single bingo card, such as bingo card 404, the number of free spins awarded may correspond to a number of winning bingo patterns occurring in the primary game. For example, a bingo card provided in the primary game may be evaluated against a ball call to determine that the bingo card includes a number of winning patterns. Each winning pattern may be awarded as, or result in, a free spin in free play bonus game 400 or during a secondary bonus game. These award amounts may be stored in a memory, and further may be arranged in an increasing or ascending order. The free spins may then be presented in an increasing or ascending order of award amount, with an award of a pattern with the highest award amount, e.g., the final award amount of the award amounts sorted in increasing or ascending order, reserved, and not paid to the player during the free play bonus game 400. Rather, the final award amount may be paid to the player during the secondary bonus game, e.g., as part of one or more additional free spins, in a bulk payment or bulk increment, during one or more rounds of play of the secondary bonus game, which may, as described previously and/or below, include any suitable bonus game, and the like. For example, in some embodiments, the final award amount awarded during a secondary bonus game comprises a credit amount that the game would have awarded on a last spin of the free play bonus game should the game not have entered into a secondary bonus game (e.g., the number of banked free spins less than the threshold and/or unsuccessful outcome on the random determination). As an example, a bingo card provided in the primary game may be evaluated against a ball call to determine that there are eight winning patterns occurring on the bingo card. Each of these eight winning patterns may be sorted in increasing or ascending order and may be presented in seven individual free spins in free play bonus game 400, with the final award amount of the eighth pattern reserved and paid during the secondary bonus game.

To illustrate, in one example, a player may achieve one or more bingo patterns using bingo card 404 and ball call 406 during the primary or base game, where the one or more patterns are associated with a total award of five-hundred credits. If it is determined that the game will enter into a secondary bonus game, a first portion of the total award, such as two-hundred credits, may be applied during the free play bonus game 400 and paid out during the free spin count-up. A second portion of the award, such as three-hundred credits, that would have been paid to the player on a last spin of the bonus game had the game not entered a secondary bonus game, may be reserved and paid to the player during the secondary bonus game. In at least one embodiment, one or more additional ball calls may also occur during free play bonus game 400, such as for example, to supplement the first portion of the total award paid out during free play bonus game 400 and/or as an alternative to divvying the total award between the primary game and free play bonus game 400.

Figure 14B:
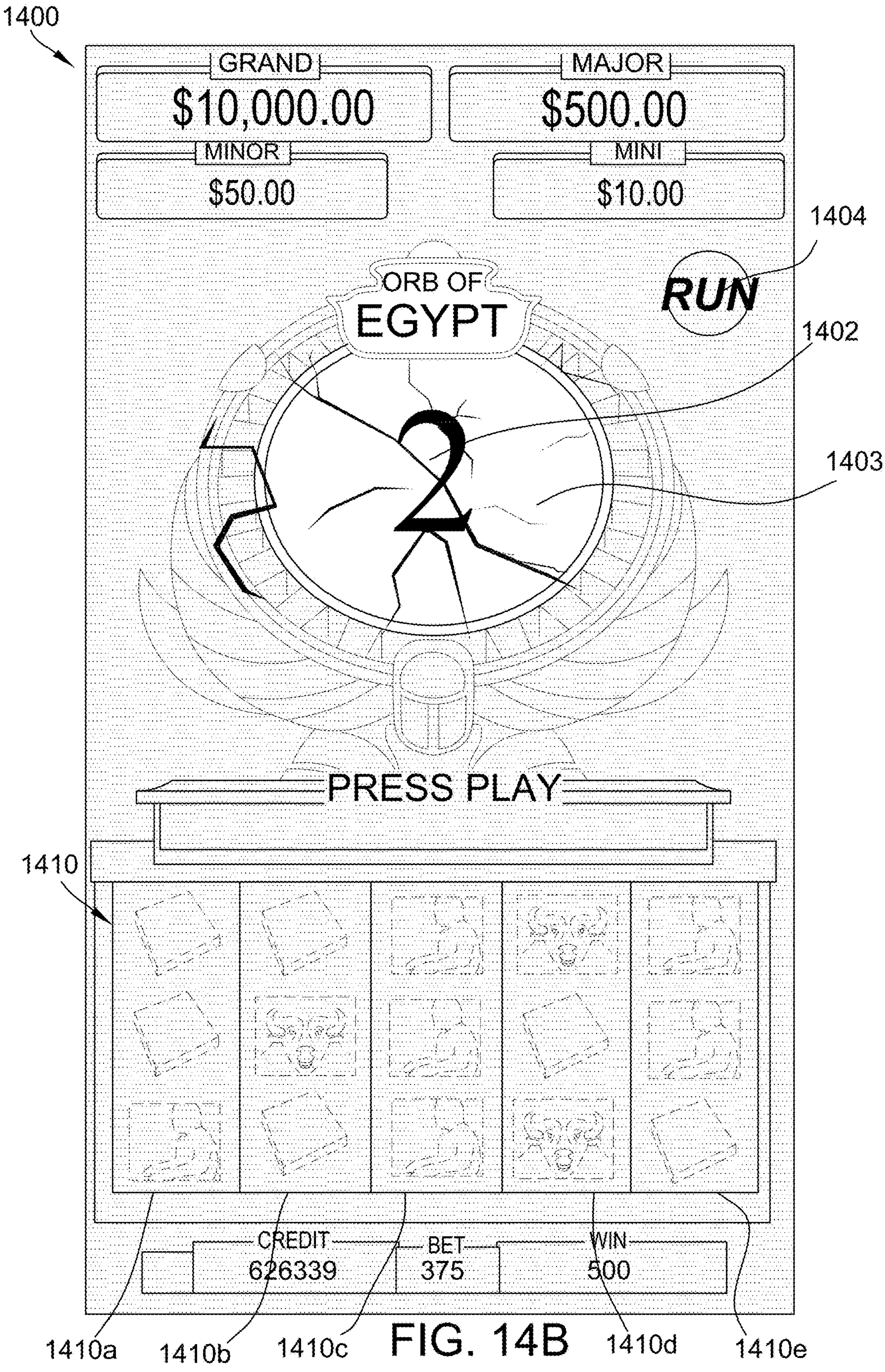
FIG. 14B is a screenshot of the other example free play bonus game of FIG. 14A, in which a first intermediate numerical indicium located within the orb is displayed during the free spin count-up.
Figure 14C:
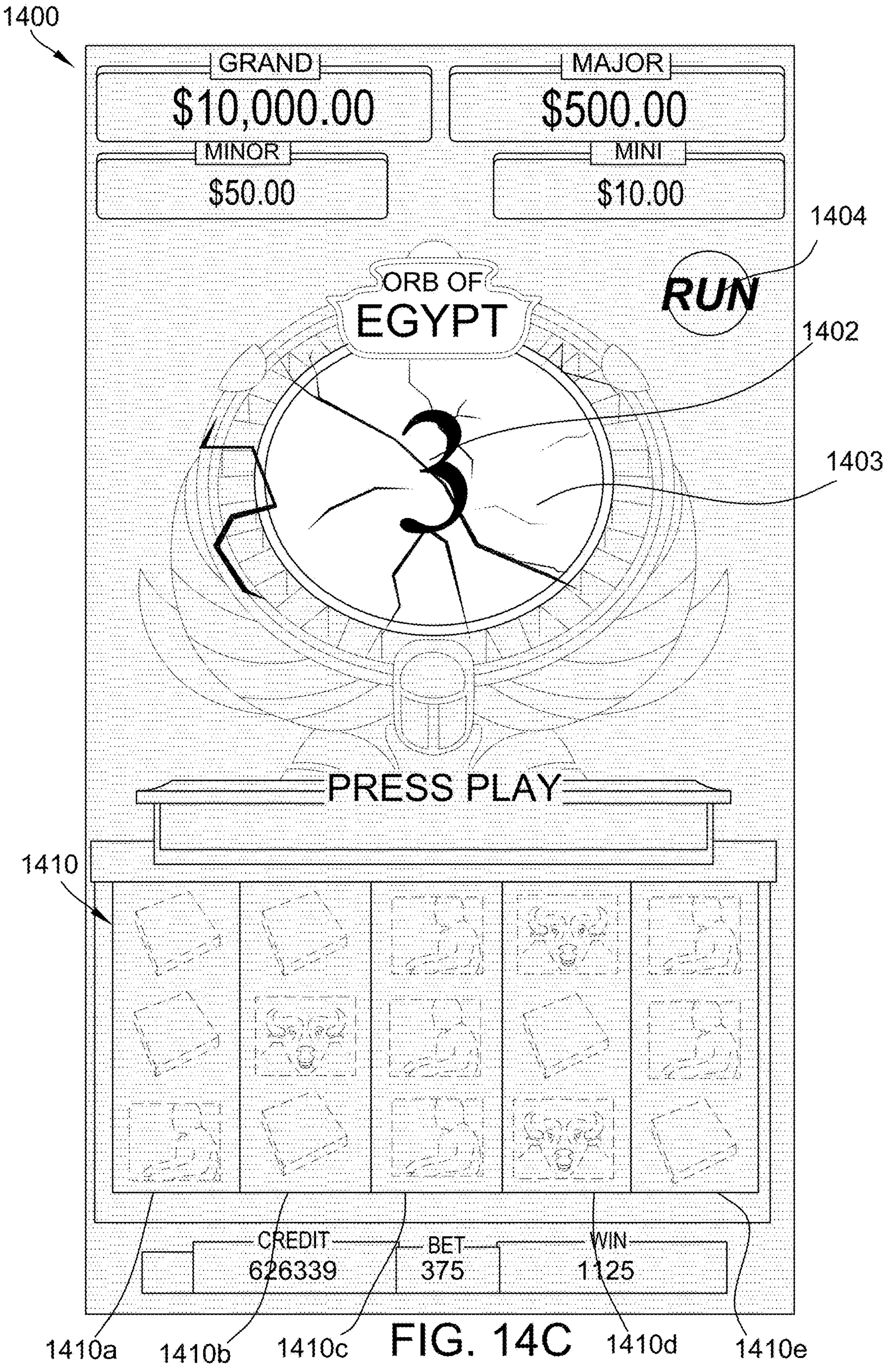
FIG. 14C is a screenshot of the other example free play bonus game of FIG. 14A, in which a final numerical indicium located within the orb is displayed during the free spin count-up.

Accordingly, with reference to FIGS. 14A-14C, an example embodiment of a free spin bonus game 1400 is shown. During free spin bonus game 1400, a free spin-count-up may be performed using a numerical indicium 1402, which may be centrally located above a matrix 1410 within an orb 1403. Matrix 1410 may comprise a plurality of columns 1410*a*-1410*e*, each column comprising one or more symbol positions for displaying a symbol. Further, if the free spin is a banked free spin, the display may be red to indicate to the player that the spin is a banked free spin. If it is a banked free spin, the display may further comprise text 1404 or other indication that it is a banked free spin.

In the example embodiment, a threshold number of banked free spins (e.g., a tier of banked free spins) may be specified that, if achieved during the free spin count-up, may trigger a secondary bonus game, if there is also a successful outcome on a random determination.

Figure 15A:
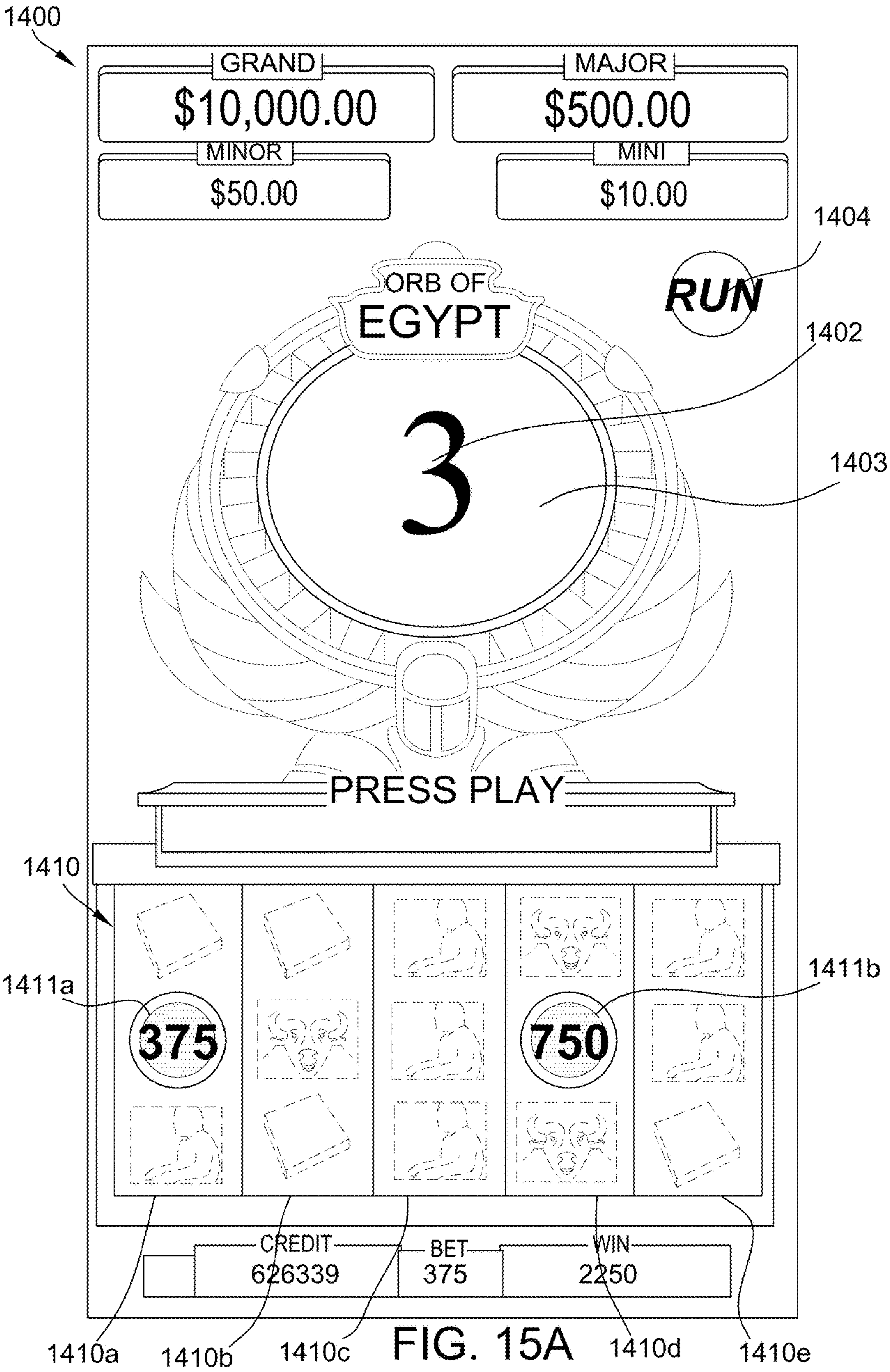
FIG. 15A is a screenshot of another example secondary bonus game played on an EGM shown in FIG. 1, including a numerical indicium located within the orb that is decremented during a free spin count-down.
Figure 15B:
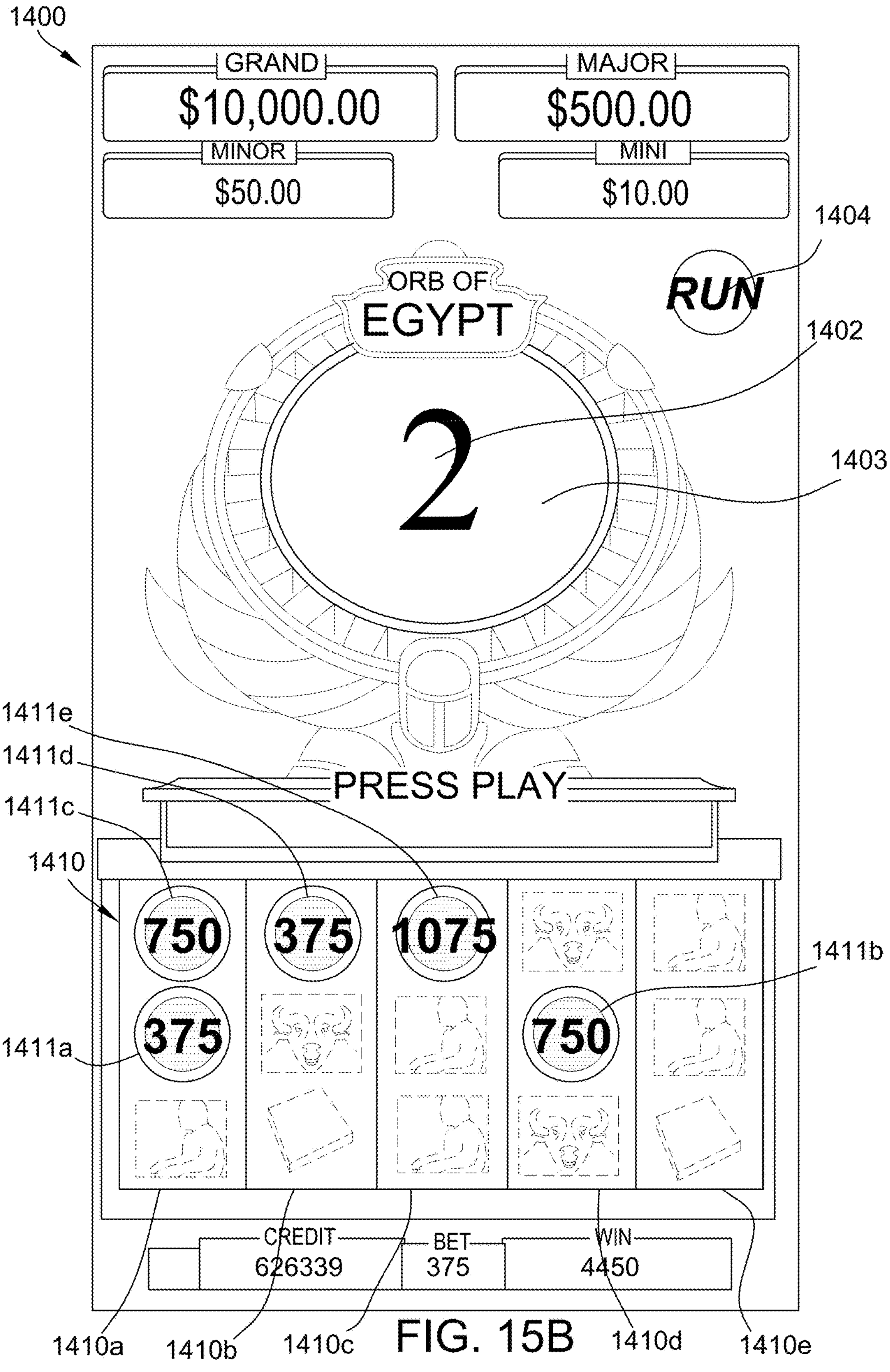
FIG. 15B is a screenshot of the other example secondary bonus game of FIG. 15A, in which an intermediate numerical indicium located within an orb is displayed during the free spin count-down and one or more credit symbols are displayed on a symbol matrix.
Figure 15C:
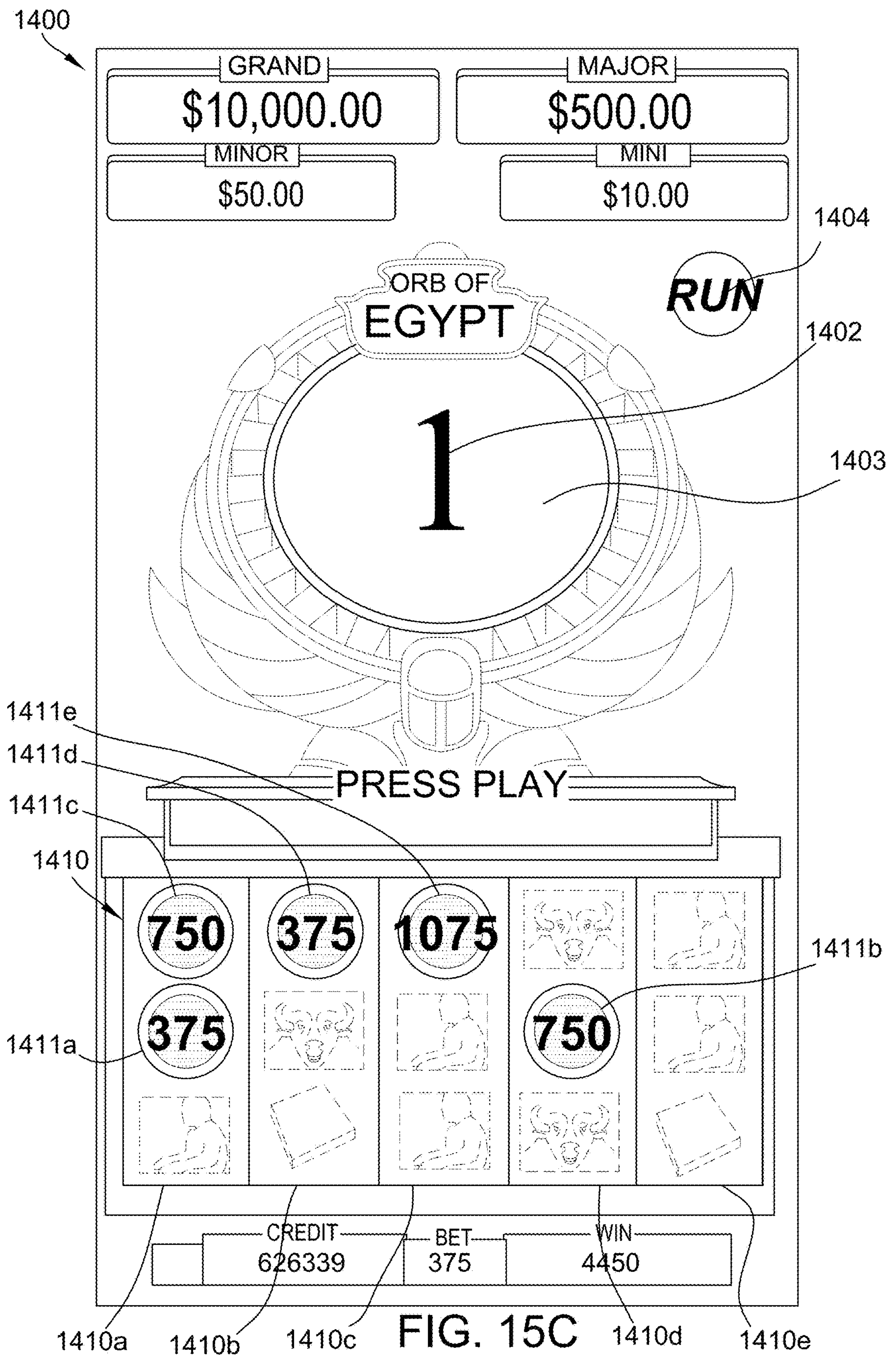
FIG. 15C is a screenshot of the other example secondary bonus game of FIG. 15A, in which a final numerical indicium located within an orb is displayed during the free spin count-down and one or more credit symbols are displayed on a symbol matrix.

As illustrated in FIGS. 15A-15C, in some embodiments, the numerical indicium 1402 may be decremented from the final value (e.g., three in the example shown) to the initial numerical indicium (of one), and each time the indicium 1402 is decremented, the secondary bonus game may be played, such as for example, by spinning a plurality of reels, spinning one or more symbols positions within a game matrix, and the like, to award the player another prize or award. Moreover, in at least some embodiments, the portion of the total award used to fund the secondary bonus game (described above) may be further partitioned or divided (equally or unequally) into the number of banked free spins, such that each time the indicium 1402 is decremented, a sub-portion of the total award allocated to the secondary bonus game 1400 is provided to the player. As a result, in at least some embodiments, gameplay may include both a free spin count-up as well as a banked free spin count-down.

In some embodiments, if a secondary free-spin count-down game is initiated, the reels may change to a set of reels comprising credit symbols, such as cash on reels symbols. Each time the indicium is decremented, the reels may spin. In some embodiments, the credit symbols are sticky symbols that, when displayed, hold in place for the remainder of the secondary bonus game. For example, in FIG. 15A, after the first free spin, two credit symbols 1411*a*, 1411*b* are awarded. FIG. 15B illustrates the display after the second free spin in which the credit symbols 1411*a*, 1411*b* were held in place and three additional credit symbols 1411*c*, 1411*d*, 1411*e* were revealed. In some embodiments, the credit symbol comprises a credit value or identifies a jackpot (e.g., mini, minor, etc.). For example, credit symbol 1411*a* corresponds to 750 credits. FIG. 15C illustrates the display after the third free spin in which the credit symbols 1411*a*, 1411*b*, 1411*c*, and 1411*d* were held in place and no additional credit symbols were revealed.

Moreover, in at least some embodiments, the portion of the total award used to fund the secondary bonus game 1001 (described above) may be further partitioned or divided (equally or unequally) into the number of banked free spins, such that each time the indicium 1402 is decremented, a sub-portion of the total award allocated to the secondary bonus game 1001 is applied and shown as a credit symbol in one or more symbol positions on the matrix. The credit symbol may comprise a credit value or identify a jackpot (e.g., as mini, minor, etc.). Additionally or alternatively, a sub-potion of the total award may be paid as part of a jackpot prize. In some embodiments, the sub-potion of the total ward may be awarded as a series of jackpot awards, such as a first jackpot award, a second jackpot award, a third jackpot award, etc.

In addition, in at least some embodiments, the numerical indicium 1402 may be decremented from the final value (e.g., three in the example shown), and each time the indicium 1402 is decremented, columns (e.g., reels) 1410*a*-1410*e*, may be re-spun and stopped to determine whether any winning outcome has landed, including, for example, a jackpot award. Moreover, in at least some embodiments, the portion of the total award used to fund the secondary bonus game (described above) may be further partitioned or divided (equally or unequally) into the number of banked free spins, such that each time the indicium 1402 is decremented, a sub-portion of the total award allocated to the secondary bonus game is provided to the player. As a result, it can be seen that in at least some embodiments, each outcome of the secondary bonus game is a winning outcome, as well as that gameplay may include both a free spin count-up as well as a banked free spin count-down. In other embodiments, one or more outcomes of the secondary bonus game may not be a winning outcome.

In some embodiments, the orb 1403 or other animation that the indicum 1402 is located within may include one or more "metamorphic" elements, such as one or more visual elements that change the appearance of the orb or other animation to indicate that a probability that the game may enter into a bonus game or a secondary bonus game is increasing or has increased (e.g., the orb "shaking", "swelling", "coming to life", and the like). In some embodiments, if the game does not enter into a bonus game or secondary bonus game, the prob or other animation may stop moving and/or otherwise indicate that the game will not enter into a bonus game or secondary bonus game (e.g., the orb will "stop coming to life").

One advantage (and specific improvement to the technical field of electronic gaming) of providing a first count up bonus game and a secondary bonus game is that a variableness or variety of game outcomes may be increased by associating a number of earned free spins with the first bonus game and the second bonus game. For example, as described above, the game award may be distributed out in variable tiers, whereby for example the awards are increased or otherwise varied among successive free spins. Moreover, in some embodiments, the distribution of the awards for each spin of the bonus games may be determined at least in part by a random output, such as a ball call in a Class II game or by an RNG output in a Class III game. For example, in some embodiments a data structure or lookup table may be stored in a memory device of EGM 104A-104X and/or in another memory device, such as a memory device of a server system 106-114. The lookup table may direct award distributions for each spin of a free spin bonus based on the number of awarded or banked free spins and further based on the random output. After a game award and number of free spins are determined, the random output may be obtained and used in combination with the lookup table to determine distribution percentages of the game award for each of the free spins in the first bonus game and/or the second bonus game.

In some embodiments, a multiplier may be awarded during a secondary free spins count-down game. For example, game award 408 may cause a multiplier or multiplication factor to be added to a monetary award in the primary game and/or the bonus game and/or the secondary bonus game. For instance, continuing with the preceding example, in some embodiments, the total number of credit symbols at the end of the secondary bonus game is compared to a threshold and if it is greater than or equal to the threshold, a multiplier is awarded. The credit symbol may comprise a credit value. In some embodiments, if the credit symbol identifies a jackpot (e.g., as mini, minor, etc.), a multiplier will not be awarded.

As described herein, in some embodiments, a portion of the total award from the primary game may be allocated to the secondary bonus game and provided to the player in portions, such as in association with each, or some, of the secondary game outcomes. In some embodiments, as described, a portion of the total award may be provided to the player during the free-spins count-up bonus game 400, and another portion may be saved and provided to the player during the secondary free-spins count-down game.

In some embodiments, a total award may be allocated prior to initiation of the free play bonus game and/or the secondary bonus game. For example, in some embodiments, a first portion of the total award may be allocated for distribution or payment to the player during the free play bonus game, such as using the plurality of free spins contributing to the free spin count-up. Likewise, a second portion of the total award may be allocated to the secondary bonus game for distribution, at least in part, to the player during the count-down initiated from the secondary bonus game.

In other embodiments, a first portion of the total award may be allocated for distribution or payment to the player during the free play bonus game, such as using the plurality of free spins contributing to the free spin count-up. If the gaming processor determines that the game will enter into a secondary bonus game, the gaming processor may determine a second portion, which is a portion of the first portion, to distribute over the secondary bonus game. For example, in some embodiments, the second portion comprises a credit that the game would have awarded on a last spin of the free play bonus game if it was determined that the game would not enter into a secondary bonus game.

As a result of the partitioning of the total award into a first and second portion, a game controller may determine a portion of the payout for both bonus games ahead of time, prior to initiation of either game, thereby reducing the processing power and time required to execute the bonus games. Additionally, the first count up bonus game and secondary bonus game provide an increased variability or variety of game outcomes by associating a number of earned free spins with the first bonus game and the second bonus game. In some embodiments whether the game enters into a secondary bonus game may be determined at least in part by a random output, thereby providing a further improvement to variability of game outcomes.

Figure 16:
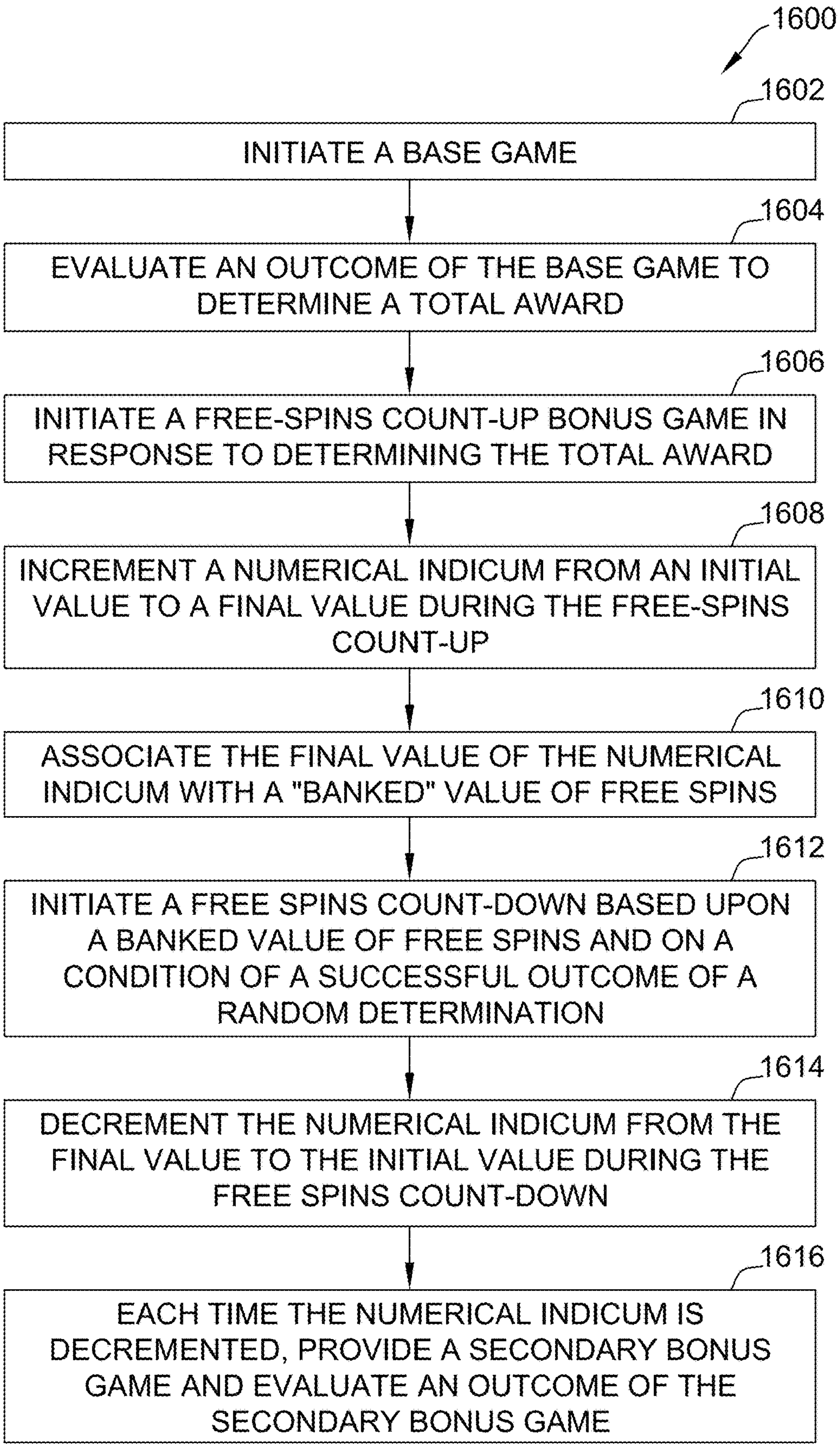
FIG. 16 is a flowchart illustrating an example embodiment of a process for implementing a wagering game that includes a free-spins count-up as well as a subsequent free-spins count-down, as described with reference to FIGS. 4-8 and 14A-15C.

FIG. 16 is a flowchart illustrating an example embodiment of a process 1600 for implementing a wagering game that includes a free-spins count-up as well as a subsequent free-spins count-down. Accordingly, in at least some embodiments, a primary or base wagering game may be initiated, such as in response to receiving a wager from a player (step 1602). An outcome of the wagering game may, in addition, be evaluated, such as to determine a total award to be provided to the player (step 1604). The evaluation may further comprise determining a percent of the total awarded to be awarded during a primary game, a first bonus game, and/or a second bonus game.

As described above, in some embodiments, all and/or a portion of the total award may be provided to the player in association with a free-spins count-up game 400, which may be triggered in response to the outcome of the wagering game being a winning outcome (e.g., triggering the total award) (step 1606). During the free-spins count-up game 400, a numerical indicium may be incremented from an initial indicium value (e.g., a value of "1) to a final indicium value that represents the number of free spins awarded to the player as a result of the total award (step 1608). In some embodiments, the number of free spins may increase as a function of the value of the total award (e.g., as the total award increases, so also the number of free spins may increase).

Moreover, in at least some embodiments, the final numerical indicium may be associated with (and/or represent) a total, or "banked," number of free spins (step 1610). Stated another way, the number of free spins awarded to the player based upon the value of the total award may be stored in a memory device of EGM 104A-104X and/or in another memory device, such as a memory device of a server system 106-114. As a result, and as described herein, the number of free spins awarded to the player may be "banked" and used in the subsequent free-spins count-down.

At the conclusion of the free-spins count-up game 400 (e.g., once the final numerical indicum is reached during the count-up), a free-spins count-down may be initiated, based upon and/or using the banked number of free spins from the free-spins count-up game 400 and on a condition of at least one successful outcome on one or more random determinations (step 1612). In some embodiments, the one or more random determinations are performed when evaluating an outcome of the base game (step 1604). The one or more random determinations may comprise using a ball call or an RNG output and a lookup table. In some embodiments, the numerical indicium may be decremented from the final numerical indicium toward the initial numerical indicium (step 1614). In response to decrementing the numerical indicium, and each time the indicium is decremented, a secondary bonus game may be executed or implemented, and an outcome of the secondary bonus game may be evaluated to determine whether to provide a secondary award to the player (step 1614).

While the disclosure has been described with respect to the figures, it will be appreciated that many modifications and changes may be made by those skilled in the art without departing from the spirit of the disclosure. Any variation and derivation from the above description and figures are included in the scope of the present disclosure as defined by the claims.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An electronic gaming device comprising:

a display device; and a processor configured to execute instructions stored in a memory device, which when executed, cause the processor to at least:

initiate a primary bonus game in response to a free play trigger condition being satisfied during a base game;

determine a number of free spins of a plurality of reels for use during the primary bonus game;

determine a random output which will decide whether a secondary bonus game will be initiated;

on a condition that there is a successful outcome on the random output, prior to initiation of the primary bonus game and the secondary bonus game, allocate a first portion of a total award to be awarded during the primary bonus game and a second portion of the total award to be awarded during the secondary bonus game;

control the display device to simulate spinning and stopping the plurality of reels in conjunction with sequentially counting up from an initial numerical indicium to a final numerical indicium in association with spinning the plurality of reels according to the determined number of free spins; and on a condition that there is a successful outcome on the random output, initiate the secondary bonus game that includes a free spin count-down from the final numerical indicium to the initial numerical indicium.

2. The electronic gaming device of claim 1, wherein the secondary bonus game is initiated on a further condition that the counting up of the number of free spins is completed in conjunction with a determination that the number of free spins is at least equal to a predefined threshold number of free spins.

3. The electronic gaming device of claim 1, wherein the instructions, when executed, further cause the processor to:

determine, during the base game, a game award;

determine a primary bonus game portion of the game award to be awarded during the primary bonus game; and determine a secondary bonus game portion of the game award to be awarded during the primary bonus game.

4. The electronic gaming device of claim 3, wherein the instructions, when executed, further cause the processor to:

provide a sub-portion of the primary bonus game portion after each spin during the primary bonus game; and provide a sub-portion of the primary bonus game portion after at least one spin during the secondary bonus game.

5. The electronic gaming device of claim 1, wherein the instructions, when executed, further cause the processor to:

determine, during the base game, a game award; and determine a primary bonus game portion of the game award to be applied during the primary bonus game and at least one spin during the secondary bonus game.

6. The electronic gaming device of claim 5, wherein the instructions, when executed, further cause the processor to:

provide at least a sub-portion of the primary bonus game portion of the game award after each spin during the primary bonus game; and provide at least a sub-portion of the primary bonus game portion of the game award after at least one spin during the secondary bonus game.

7. The electronic gaming device of claim 1, wherein the number of free spins is determined based on a game outcome of the base game.

8. The electronic gaming device of claim 7, wherein the base game is a bingo game and wherein the number of free spins is determined based on a number of winning bingo patterns occurring during play of the base game.

9. The electronic gaming device of claim 7, wherein the number of free spins is determined based on a number of winning game outcomes during play of the base game.

10. The electronic gaming device of claim 1, wherein the instructions, when executed, further cause the processor to:

apply a game enhancing feature during at least one of the primary bonus game or the secondary bonus game.

11. The electronic gaming device of claim 10, wherein game enhancing feature includes at least one of: a progressive jackpot, an award multiplier, an additional bonus game, and a persistent collectable game item.

12. The electronic gaming device of claim 1, wherein the instructions, when executed, further cause the processor to:

determine a total game award based on a bingo card; and determine a first portion of the total game award to be applied during the primary bonus game and a second portion of the total game award to be awarded during the secondary bonus game, based on a bingo card.

13. The electronic gaming device of claim 1, wherein the random output is generated using a ball call or an RNG output.

14. A gaming system comprising:

at least one memory; and a processor configured to execute instructions stored in the memory, which when executed, cause the processor to at least:

initiate a primary bonus game in response to a free play trigger condition being satisfied during a base game;

determine a number of free spins of a plurality of reels for use during the primary bonus game;

determine a random output which will decide whether a secondary bonus game will be initiated;

on a condition that there is a successful outcome on the random output, prior to initiation of the primary bonus game and the secondary bonus game, allocate a first portion of a total award to be awarded during the primary bonus game and a second portion of the total award to be awarded during the secondary bonus game;

simulate spinning and stopping the plurality of reels in conjunction with sequentially counting up from an initial numerical indicium to a final numerical indicium in association with spinning the plurality of reels according to the determined number of free spins; and on a condition that there is a successful outcome on the random output, initiate the secondary bonus game that includes a free spin count-down from the final numerical indicium to the initial numerical indicium.

15. The gaming system of claim 14, wherein the secondary bonus game is initiated on a further condition that the counting up of the number of free spins is completed in conjunction with a determination that the number of free spins is at least equal to a predefined threshold number of free spins.

16. The gaming system of claim 14, wherein the instructions, when executed, further cause the processor to:

determine, during the base game, a game award;

determine a primary bonus game portion of the game award to be awarded during the primary bonus game; and determine a secondary bonus game portion of the game award to be awarded during the primary bonus game.

17. The gaming system of claim 15, wherein the instructions, when executed, further cause the processor to:

provide a sub-portion of the primary bonus game portion after each spin during the primary bonus game; and provide a sub-portion of the primary bonus game portion after at least one spin during the secondary bonus game.

18. The gaming system of claim 14, wherein the number of free spins is determined based on a game outcome of the base game.

19. The gaming system of claim 14, wherein the random output is generated using a ball call or an RNG output.

20. A non-transitory computer-readable storage medium with instructions stored thereon that, in response to execution by at least one processor, cause the at least one processor to:

initiate a primary bonus game based on a free play trigger condition being satisfied during a base game;

determine a number of free spins of a plurality of reels for use during the primary bonus game;

determine a random output which will decide whether a secondary bonus game will be initiated;

on a condition that there is a successful outcome on the random output, prior to initiation of the primary bonus game and the secondary bonus game, allocate a first portion of a total award to be awarded during the primary bonus game and a second portion of the total award to be awarded during the secondary bonus game;

simulate spinning and stopping the plurality of reels;

count up, sequentially, from an initial numerical indicium to a final numerical indicium during each spin of the plurality of reels according to the determined number of free spins; and on a condition that there is a successful outcome on the random output, initiate a secondary bonus game that includes a free spin count-down from the final numerical indicium to the initial numerical indicium.

* * * * *